US007924952B2

(12) United States Patent
Suzuki et al.

(10) Patent No.: US 7,924,952 B2
(45) Date of Patent: Apr. 12, 2011

(54) SIGNAL DETECTION DEVICE, SIGNAL DETECTION CIRCUIT, SIGNAL DETECTION METHOD, AND PROGRAM

(75) Inventors: Kazuaki Suzuki, Kyoto (JP); Mikihiro Ouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 11/596,076

(22) PCT Filed: May 17, 2005

(86) PCT No.: PCT/JP2005/008934
§ 371 (c)(1), (2), (4) Date: Jun. 20, 2007

(87) PCT Pub. No.: WO2005/114895
PCT Pub. Date: Dec. 1, 2005

(65) Prior Publication Data

US 2008/0019430 A1 Jan. 24, 2008

(30) Foreign Application Priority Data

May 20, 2004 (JP) ................................ 2004-150850

(51) Int. Cl.
*H04L 27/06* (2006.01)

(52) U.S. Cl. ........ 375/343; 375/149; 375/347; 375/354; 375/367; 375/346; 375/240; 375/259; 375/326

(58) Field of Classification Search .................. 375/150
See application file for complete search history.

(56) References Cited

U.S. PATENT DOCUMENTS

| | | | | |
|---|---|---|---|---|
| 5,745,528 | A | 4/1998 | Fimoff et al. | |
| 5,852,630 | A * | 12/1998 | Langberg et al. | 375/219 |
| 6,480,237 | B1 * | 11/2002 | Jun | 348/558 |
| 6,504,578 | B1 | 1/2003 | Gu | |
| 6,985,192 | B1 * | 1/2006 | Bouillet et al. | 348/735 |
| 7,149,266 | B1 * | 12/2006 | Imamura et al. | 375/355 |
| 7,154,975 | B1 * | 12/2006 | Bohnke et al. | 375/368 |
| 2003/0179813 | A1 | 9/2003 | Morita et al. | |
| 2004/0042534 | A1 * | 3/2004 | Raphaeli et al. | 375/150 |

FOREIGN PATENT DOCUMENTS

| | | |
|---|---|---|
| JP | 11-112489 | 4/1999 |
| JP | 2001-267966 | 9/2001 |
| JP | 2002-314520 | 10/2002 |

* cited by examiner

*Primary Examiner* — Shuwang Liu
*Assistant Examiner* — Dhaval Patel
(74) *Attorney, Agent, or Firm* — Wenderoth, Lind & Ponack, L.L.P.

(57) ABSTRACT

A signal detection device rapidly and accurately detects a desired signal from a reception signal. A correlation unit 231 outputs a correlation value string obtained by cross-correlating an input symbol string and a reference symbol string, a first position detection unit 232 detects a position of a correlation value viewed as a maximum or a local maximum on the correlation value string, a compensation unit 233 performs compensation by suppressing correlation error values from correlation value at positions other than the detected position, a second position detection unit 234 detects a position of a correlation value viewed as the maximum on the compensated correlation value string, and a sync-detected signal generation unit 235 outputs a sync-detected signal based on the position detected by the second position detection unit 234.

12 Claims, 22 Drawing Sheets

INPUT SIGNAL
231
CORRELATION UNIT
233
COMPENSATION UNIT
232
FIRST POSITION DETECTION UNIT
OUTPUT SIGNAL
234
SECOND POSITION DETECTION UNIT
235
SYNC-DETECTED SIGNAL GENERATION UNIT
SYNC-DETECTED SIGNAL
23

CORRELATION VALUE
t
S21
S22
185
169
79
52
43
39
31
22
11
10
20
15
10
5
0
-21
-22
-23
-32
-45
-34
-31

FIG. 8

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| CORRELATION ERROR VALUE | -0.2 | 0.3 | 0 | 0.4 | -0.4 | -0.2 | 0.3 | -0.1 | — | -0.2 | -0.3 | 0.3 | -0.4 | 0 | -0.3 | -0.2 | 0.1 |

FIG. 9A (NORMALIZED WITH CORRELATION VALUE AT T=9)

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| CORRELATION VALUE | -0.12 | 0.23 | 0 | 0.42 | 0 | -0.12 | -0.12 | 0.21 | 1.0 | -0.17 | 0.91 | 0.28 | 0.24 | 0 | 0.18 | 0.12 | 0.17 |

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| COMPENSATED VALUE | 0.08 | -0.07 | 0 | 0.02 | 0.4 | 0.18 | -0.42 | 0.31 | 1.0 | 0.03 | 1.21 | -0.02 | 0.64 | 0 | 0.48 | 0.32 | 0.07 |

S30 S31 S29

FIG. 10A (NORMALIZED WITH CORRELATION VALUE AT T=11)

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| CORRELATION VALUE | 0 | 0.47 | 0 | -0.14 | -0.14 | 0.23 | 1.09 | -0.19 | 1.0 | 0.31 | -0.27 | 0 | -0.20 | 0.13 | 0.18 | -0.18 | 0 |

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| COMPENSATED VALUE | 0.2 | 0.17 | 0 | -0.54 | 0.36 | 0.43 | 0.79 | -0.09 | 1.0 | 0.51 | 0.03 | -0.3 | 0.2 | 0.13 | 0.48 | 0.02 | -0.1 |

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| VALUE | -0.12 | 0.23 | 0 | 0.42 | 0 | -0.12 | -0.12 | 0.21 | 1.0 | -0.17 | 1.21 | 0.28 | 0.24 | 0 | 0.18 | 0.12 | 0.17 |

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| VALUE | 0 | 0.47 | 0 | -0.14 | -0.14 | 0.23 | 0.79 | -0.19 | 1.0 | 0.31 | -0.27 | 0 | -0.20 | 0.13 | 0.18 | -0.18 | 0 |

| t | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| VALUE | 0.48 | 0.83 | 0.6 | 1.02 | 0.6 | 0.48 | 0.48 | 0.81 | 1.0 | 0.43 | 1.51 | 0.88 | 0.84 | 0.6 | 0.78 | 0.72 | 0.77 |

S49 (t = 2)

S50 (VALUE 1.51)

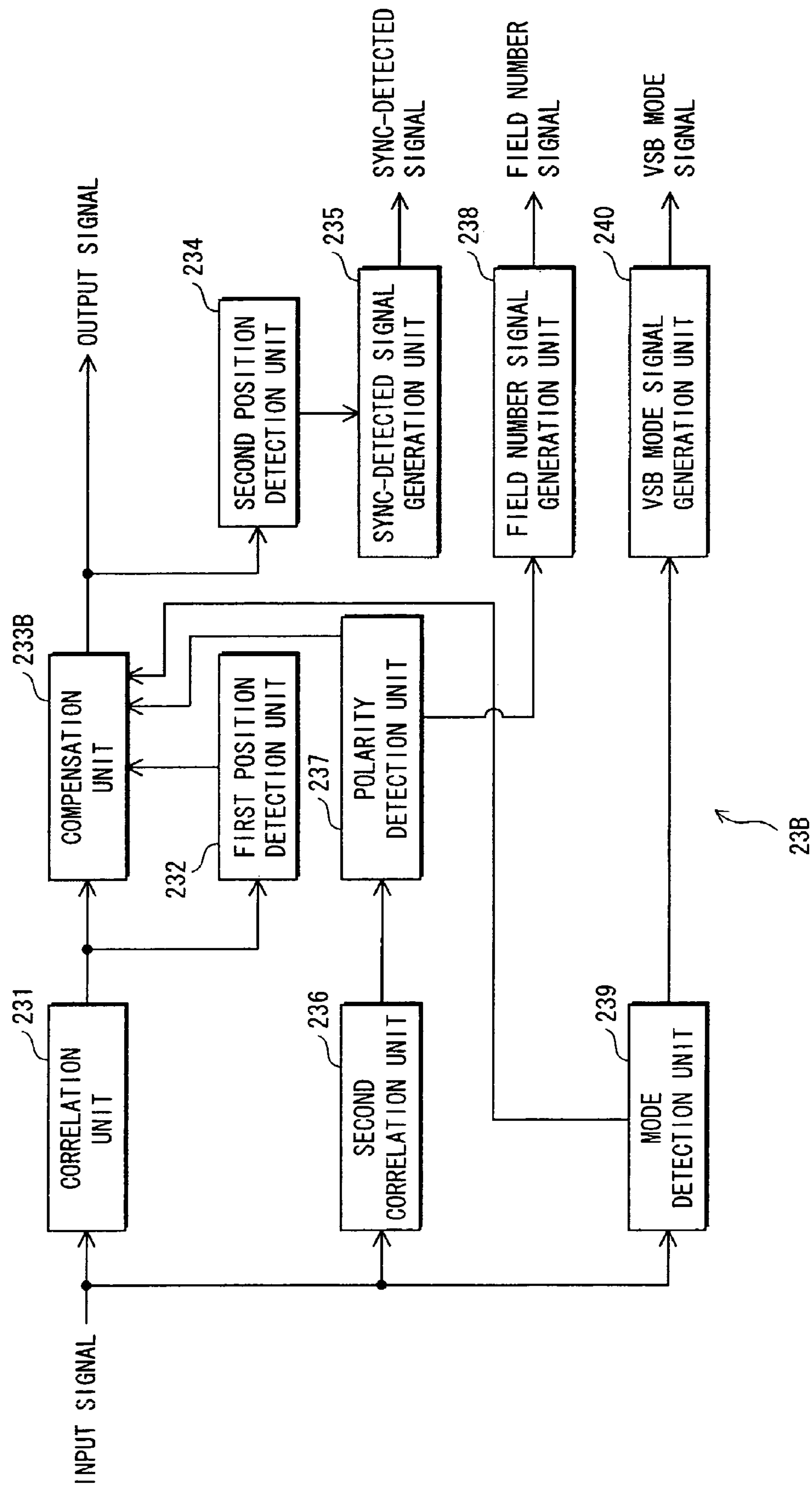
FIG. 16
INPUT SIGNAL
231
CORRELATION UNIT
233B
COMPENSATION UNIT
OUTPUT SIGNAL
232
FIRST POSITION DETECTION UNIT
234
SECOND POSITION DETECTION UNIT
235
SYNC-DETECTED SIGNAL GENERATION UNIT
SYNC-DETECTED SIGNAL
236
SECOND CORRELATION UNIT
237
POLARITY DETECTION UNIT
238
FIELD NUMBER SIGNAL GENERATION UNIT
FIELD NUMBER SIGNAL
239
MODE DETECTION UNIT
240
VSB MODE SIGNAL GENERATION UNIT
VSB MODE SIGNAL
23B

FIG. 18

| VSB MODE | 24-BIT DATA |
|---|---|
| 2-VSB | 0000 1111 0000 1111 0000 1111 |
| 4-VSB | 0000 1111 0000 1111 1001 0110 |
| 8-VSB | 0000 1111 0000 1111 1010 0101 |
| 16-VSB | 0000 1111 0000 1111 1100 0011 |
| TC 8-VSB | 0000 1010 0101 1111 0101 1010 |

CUMULATIVE FIELD NUMBER SETTING INFORMATION
239B
240
VSB MODE SIGNAL GENERATION UNIT
504
MODE SPECIFICATION UNIT
503
CUMULATIVE ADDITION UNIT
501
THIRD CORRELATION UNIT
2-VSB
4-VSB
8-VSB
16-VSB
TC 8-VSB
INPUT SIGNAL

SIGNAL DETECTION DEVICE, SIGNAL DETECTION CIRCUIT, SIGNAL DETECTION METHOD, AND PROGRAM

TECHNICAL FIELD

The present invention relates to technology for cross-correlating a received input signal and a known reference signal to detect a desired signal, and in particular to technology for rapidly and accurately detecting a desired signal in a poor channel environment.

BACKGROUND ART

Conventionally, in terrestrial wireless communication and wireless broadcasting for mobile phones, televisions and the like, signals transmitted from a base station etc. are distorted due to the effects of white noise and multipath, thereby making it impossible for a reception device receiving such signals to properly detect a synchronizing signal included therein.

The following patent document 1 discloses a signal detection device as a conventional signal detection device for detecting a synchronizing signal.

FIG. 21 shows a functional structure of the signal detection device disclosed in patent document 1.

A signal detection device 1000 includes a correlating unit 1001, a maximum value position detector 1002 and a reliability measurer 1003.

The correlating unit 1001 cross-correlates an input signal (i.e., a received signal) and a known synchronizing signal on the receiving side, the maximum value position detector 1002 detects a peak position in a resulting string of correlation values, and the reliability measurer 1003 checks whether the position detected by the maximum value detector 1002 is the proper position of the synchronizing signal, thereby measuring the reliability of the detected position.

Patent Document 1: U.S. Pat. No. 6,504,578

DISCLOSURE OF THE INVENTION

Problems Solved by the Invention

However, the signal detection device of patent document 1 has a problem with speed since it is necessary to detect a position a number of times to achieve reliability, and even when the above reliability measuring is performed, there still remains the possibility of detecting an erroneous position as the synchronizing signal position.

This is because the maximum value may appear at an erroneous position due to the signal, which was distorted by a poor channel environment, including components that have been affected by white noise and multipath.

The present invention has been achieved to solve the above problem, and aims to provide a signal detection device, signal detection circuit, signal detection method, and computer program that can rapidly and accurately detect a desired signal from a reception signal that has been distorted in a poor channel environment.

Means to Solve the Problems

The above object of the present invention is achieved by a signal detection device, including: a correlation unit operable to output a correlation value string based on a result of cross-correlating a reference signal value string included in an input signal value string and signal value strings that are obtained by shifting a certain signal value string one by one in order of the input signal value string and that correspond in length to the reference signal value string; and a compensation unit operable to perform compensation by obtaining a correlation error of at least one of the output correlation values and suppressing the correlation error from the at least one correlation value.

Also, a signal detection circuit of the present invention is a signal detection circuit, including: a correlation circuit operable to output a correlation value string based on a result of cross-correlating a reference signal value string included in an input signal value string and signal value strings that are obtained by shifting a certain signal value string one by one in order of the input signal value string and that correspond in length to the reference signal value string; and a compensation circuit operable to perform compensation by obtaining a correlation error of at least one of the output correlation values and suppressing the correlation error from the at least one correlation value.

Also, a signal detection method of the present invention is a signal detection method for performing compensation by obtaining a correlation error of at least one correlation value on a correlation value string that is based on a result of cross-correlating a reference signal value string included in a signal value string and signal value strings that are obtained by shifting a certain signal value string one by one in order of the signal value string and that correspond in length to the reference signal value string, and suppressing the correlation error from the at least one correlation value.

Also, a program of the present invention is a computer program for causing a signal detection device or a signal detection circuit to execute signal detection processing, wherein the signal detection processing includes a compensation step of performing compensation by obtaining a correlation error of at least one correlation value on a correlation value string that is based on a result of cross-correlating a reference signal value string included in a signal value string and signal value strings that are obtained by shifting a certain signal value string one by one in order of the signal value string and that correspond in length to the reference signal value string, and suppressing the correlation error from the at least one correlation value.

Effects of the Invention

The signal detection device having the above structure performs compensation by suppressing correlation errors from correlation values based on a result of cross-correlation an input signal value string and a reference signal value string.

This structure makes it possible to suppress a correlation error from a correlation value that has been detected as the maximum and includes components affected by multipath, and detect the position of an accurate maximum from the compensated correlation value string. In other words, this structure enables the accurate detection of a desired signal.

It is also possible to rapidly perform detection since it is not necessary to repeatedly detect a sync position until reliability is obtained, as in the signal detection device disclosed in the above patent document.

Also, the signal detection device may further include: a first position detection unit operable to detect a first position in the correlation value string output by the correlation unit, the first position being based on a position of a correlation value viewed as a maximum or a local maximum, wherein the compensation unit performs the compensation by obtaining the correlation error of the correlation value at least one position other than the first position detected by the first position detection unit, and suppressing the correlation error from the at least one correlation value, may further include: a second position detection unit operable to detect a second position in the correlation value string compensated by the compensation unit, the second position being based on a position of a correlation value viewed as a maximum on the compensated correlation value string, and the compensation unit may perform the compensation by associating the first position detected by the first position detection unit and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, and suppressing, based on a correlation error value at a position in the correlation error value string corresponding to a second position other than the first position, the correlation error from a correlation value at the second position.

Also, a second reference signal value string specifying a polarity may be included in the input signal value string, the signal detection device may further include: a second correlation unit operable to output a second correlation value string based on a result of cross-correlating the second reference signal value string and signal value strings that are obtained by shifting a certain signal value string one by one in order of the input signal value string and that correspond in length to the second reference signal value string; and a polarity detection unit operable to output a polarity that is specified based on a position of a correlation value viewed as a maximum or a local maximum on the second correlation value string output by the second correlation unit, and the compensation unit may perform the compensation based on the polarity specified by the polarity detection unit and the correlation error.

According to this structure, regarding the compensation unit, an input signal that includes a second reference signal value string indicating polarity can be applied in a case of detecting a synchronization signal.

Also, a third reference signal value string specifying a signal mode of an input signal may be included in the input signal value string, the signal detection device may further include: a mode detection unit operable to detect the third reference signal value string based on the input signal value string, and the compensation unit may perform the compensation based on a signal mode detected by the mode detection unit and the correlation error.

According to this structure, the compensation unit can use an input signal that includes a third reference signal value string indicating a signal mode, for synchronization signal detection.

Also, the first position detection unit may detect a maximum position that is a position corresponding to a correlation value viewed as the maximum on the correlation value string, and a local maximum position that is a position corresponding to a correlation value viewed as the local maximum on the correlation value string, and the compensation unit may perform the compensation by one of associating the local maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a correlation error value on the correlation error value string at a position corresponding to the maximum position, and suppressing, based on the correlation error value, a correlation error from the correlation value at the maximum position, and associating the maximum position and a position of a maximum on the correlation error value string, obtaining a correlation error value on the correlation error value string at a position corresponding to the local maximum position, and suppressing, based on the correlation error value, a correlation error from the correlation value at the local maximum position.

This structure enables the precise suppression of correlation errors in compensation processing.

Also, the first position detection unit may detect a maximum position that is a position in the correlation value string which corresponds to a correlation value viewed as the maximum, and a local maximum position that is a position in the correlation value string which corresponds to a correlation value viewed as the local maximum, and the compensation unit may perform the compensation by associating the maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a first correlation error value on the correlation error value string at a position corresponding to the local maximum position, associating the local maximum position and the position of the maximum on the correlation error value string, obtaining a second correlation error value on the correlation error value string at a position corresponding to the maximum position, and one of suppressing, based on a first composite correlation error value obtained by subtracting the second correlation error value from the first correlation error value, a correlation error from the correlation value at the local maximum position, and suppressing, based on a second composite correlation error value obtained by subtracting the first correlation error value from the second correlation error value, a correlation error from the correlation value at the maximum position or the local maximum position.

This structure reduces the number of operations performed in compensation processing.

Also, the compensation unit may output a value that is based on a compensated correlation value string to at least one of an equalization unit, a spectrum conversion unit, and a channel response measuring unit.

According to this structure, it is possible to use the compensated correlation value string for generation of a filter coefficient used in equalization, or the measurement of spectrum or channel response.

Also, if a currently detected position differs from a previously detected position, the second position detection unit may output an amount of change therebetween.

According to this structure, it is possible to convey a shift in the basis position separately from channel response when, for example, using channel response with respect to something other than signal detection, such as equalization.

Also, the signal detection circuit may further include: a first position detection circuit operable to detect a first position in the correlation value string output by the correlation circuit, the first position being based on a position of a correlation value viewed as a maximum or a local maximum; and a second position detection circuit operable to detect a second position in the correlation value string compensated by the compensation circuit, the second position being based on a position of a correlation value viewed as a maximum on the compensated correlation value string, wherein the mode detection circuit may include: a third correlation circuit operable to specify a position section of a mode signal value string in the input signal with use of output from the first position detection circuit or the second position detection circuit, and cross-correlate a signal value string in the position section and a third reference signal value string that is at least a part of one of a plurality of the mode signal value strings each of which is for identifying a different one of the signal modes; a cumulative addition circuit operable to cumulatively add correlation values calculated by the third correlation circuit to the plurality of mode signal value strings N times, N being a natural number; and a mode specification circuit operable to specify, from among the plurality of mode signal value strings, a mode signal value string having a highest value cumulatively added by the cumulative addition circuit, as a signal mode of the input signal string.

This structure enables the accurate detection of a signal in a severe multipath environment, and more accurate mode detection when there is noise and severe multipath by taking a correlation using a signal before hard-decision.

Also, the signal detection circuit may further include: a first position detection circuit operable to detect a first position in the correlation value string output by the correlation circuit, the first position being based on a position of a correlation value viewed as a maximum or a local maximum; and a second position detection circuit operable to detect a second position in the correlation value string compensated by the compensation circuit, the second position being based on a position of a correlation value viewed as a maximum on the compensated correlation value string, wherein the mode detection circuit may include: a third correlation circuit operable to output correlation values with respect to a certain mode signal value string by specifying a position section of a mode signal value string in the input signal with use of output from the first position detection circuit or the second position detection circuit, and cross-correlating a signal value string in the position section and a third reference signal value string that is at least a part of one of a plurality of the mode signal value strings each of which is for identifying a different one of the signal modes, and output values obtained by inverting a sign of the correlation values as correlation values with respect to another mode signal value string; a cumulative addition circuit operable to cumulatively add correlation values calculated by the third correlation circuit to the plurality of mode signal value strings N times, N being a natural number; and a mode specification circuit operable to specify, from among the plurality of mode signal value strings, a mode signal value string having a highest value cumulatively added by the cumulative addition circuit, as a signal mode of the input signal string.

When detection is limited to two candidate modes, this structure enables mode detection by performing a single correlation operation.

BRIEF DESCRIPTION OF THE DRAWINGS

FIG. 8 is a table showing an exemplary correlation error value string;

FIG. 9A is a table showing the correlation value string of FIG. 5 normalized considering a correlation value at T=9 to be the basis and including correlation values at positions before and after T=9, and FIG. 9B is a table showing the correlation value string of FIG. 9A after compensation processing has been performed;

FIG. 10A is a table showing the correlation value string of FIG. 5 normalized considering a correlation value at T=11 to be the basis and including correlation values at positions before and after T=11, and FIG. 10B is a table showing the correlation value string of FIG. 10A after compensation processing has been performed;

FIG. 12A is a table showing a correlation value string resulting from the correlation value string in FIG. 9A being compensated by compensation processing 2, and FIG. 12B is a table showing a correlation value string resulting from the correlation value string in FIG. 10A being compensated by compensation processing 2;

FIG. 14 is a table showing the correlation value string shown in FIG. 9A after compensation processing has been performed;

FIG. 16 shows a functional structure of a sync detection unit according to variation 2;

FIG. 18 is a table showing 24-bit data of VSB modes in the ATSC system;

DESCRIPTION OF THE CHARACTERS

Figure 1:
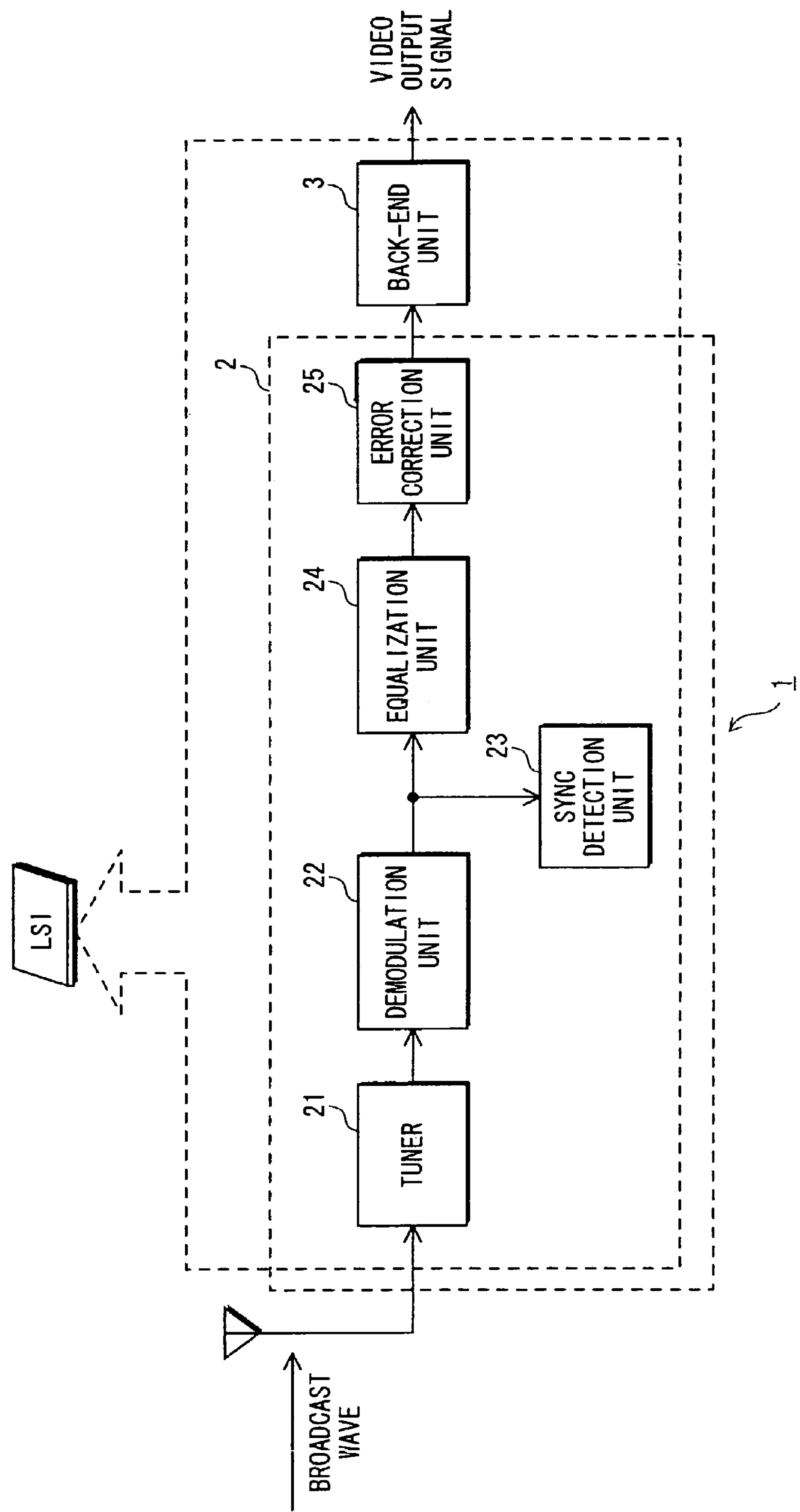
FIG. 1 shows an exemplary functional structure of a broadcast reception device.

1 broadcast reception device
2 front-end unit
3 back-end unit
21 tuner
22 demodulation unit
23 sync detection unit
24 equalization unit
25 error correction unit
231 correlation unit
232 first position detection unit
233, 233A, 233B compensation unit

234 second position detection unit
235 synchronization-detected signal generation unit
236 second correlation unit
237 polarity detection unit
238 field number signal generation unit
239, 239A, 239B, 239C mode detection unit
240 VSB mode signal generation unit
501 third correlation unit
502, 504, 603 mode specification unit
503, 602 cumulative addition unit
601 distance calculation unit

BEST MODE FOR CARRYING OUT THE INVENTION

Embodiments of the present invention are described below with reference to the drawings.

Embodiment 1

Functional Structure of a Broadcast Reception Device

FIG. 1 shows a functional structure of a broadcast reception device that uses a signal detection device of the present invention as a sync detection unit.

A broadcast reception device 1 is a reception device compatible with the single carrier 8 level VSB (Vestigial Sideband) modulation system called the ATSC (Advanced Television Systems Committee) system, which is the terrestrial digital broadcasting method used in the United States. The broadcast reception device 1 is functionally divided into a front-end unit 2 and a back-end unit 3.

As shown in FIG. 1, the front-end unit 2 and the back-end unit 3 are realized by an integrated circuit.

The front-end unit 2 includes a tuner 21, a demodulation unit 22, a sync detection unit 23, an equalization unit 24 and an error correction unit 25.

The tuner 21 tunes to a received VSB-modulated broadcast signal.

The demodulation unit 22 demodulates the tuned VSB-modulated broadcast signal and outputs a symbol string of a VSB signal. A data structure of a VSB signal is described later.

The sync detection unit 23 detects a segment synchronization signal and a field synchronization signal from a symbol string.

The equalization unit 24 suppresses distorted components in a symbol string distorted by multipath.

The error correction unit 25 corrects code error generated on a channel, and outputs a transport stream.

The back-end unit 3 receives the transport stream output from the front-end unit 2, converts the received transport stream to video signals, audio signals and the like, and outputs the video and audio signals and the like.

VSB Data Frame Structure

Next is a description of VSB data frames in the ATSC system.

Figure 4:
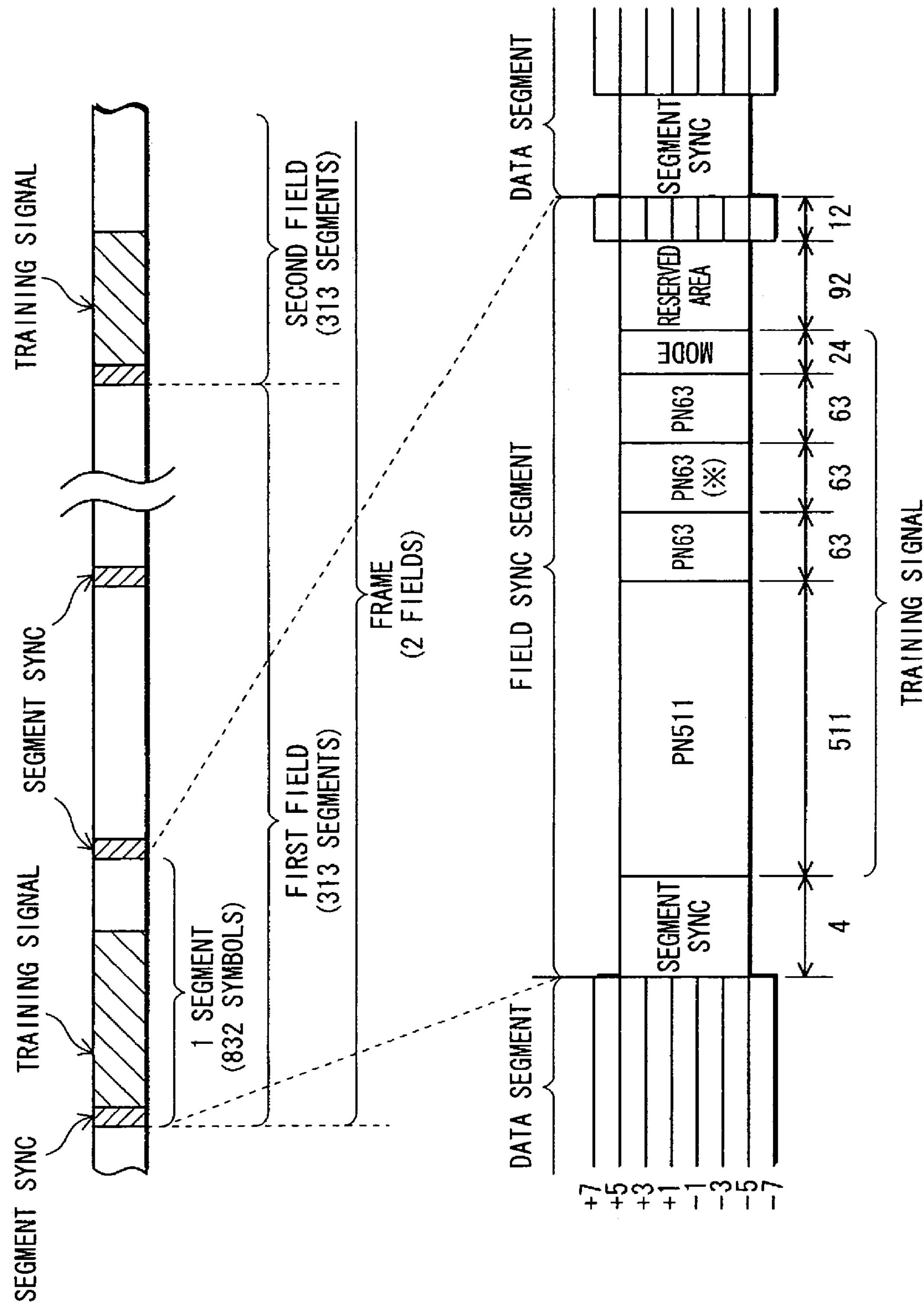
FIG. 4 shows a data structure of a VSB data frame in the ATSC system.

FIG. 4 shows a data structure of a VSB data frame in the ATSC system.

A VSB data frame is constituted from two fields, a first field and a second field.

A field is composed of 313 segments, and the first segment is a field sync segment. The first and second fields can be differentiated due to the fact that the polarity of the second of three PN63 symbol strings included in the field sync segment is inverted.

Segments other than the first segment are composed of a segment sync symbol string (4 symbols) and a data symbol string (828 symbols). In 8-VSB mode, a symbol is made up of 3 bits.

The field sync segment is composed of a segment sync (4 symbols), a training signal (724 symbols), and a reserved area etc. (104 symbols).

The training signal is a pseudo noise signal taking pseudo random values in a signal bandwidth. The training signal is composed of a PN511 symbol string (511 symbols), three PN63 symbol strings (63 symbols each, a total of 189 symbols), and a VSB mode symbol string (24 symbols) for identifying one of the five VSB modes, 2-VSB, 4-VSB, 8-VSB, 16-VSB and TC 8-VSB.

In 8-VSB mode, data symbols constituting a data segment are encoded information such as video, audio, data, etc., and are represented as, for example, the eight value levels, +7, +5, +3, +1, −1, −3, −5, and −7.

In 8-VSB mode, symbols in the segment sync symbol string and the field sync symbol string are represented as, for example, the two value levels +5 and −5, with the exception of a portion of the reserved symbol string.

In the present invention, the above-mentioned segment sync and training signal are targets of detection by the sync detection unit 23.

Outline of Sync Detection Processing

One example of a method of detecting the above synchronization signal in a conventional signal detection device involves detection using a correlation operation. This method is effective in cases where the detected signal has a high autocorrelativity and there is a steep peak in the result of the correlation operation. This is because it is possible to detect the peak position without error even if some noise or the like is included in the detected signal, since there is a large difference between the peak and other values, thereby making it possible to detect a desired signal from the peak position.

Given that autocorrelation is a correlation operation performed between a signal and itself, and a correlation operation obtains an inner product of signals that have been shifted and an un-shifted signal, it is apparent from looking at an actual correlation value string that there is only a peak in a case of signal with a high autocorrelativity, i.e. having a small correlativity value with its own shifted signal, at a correlation value between un-shifted signals.

Figure 22:
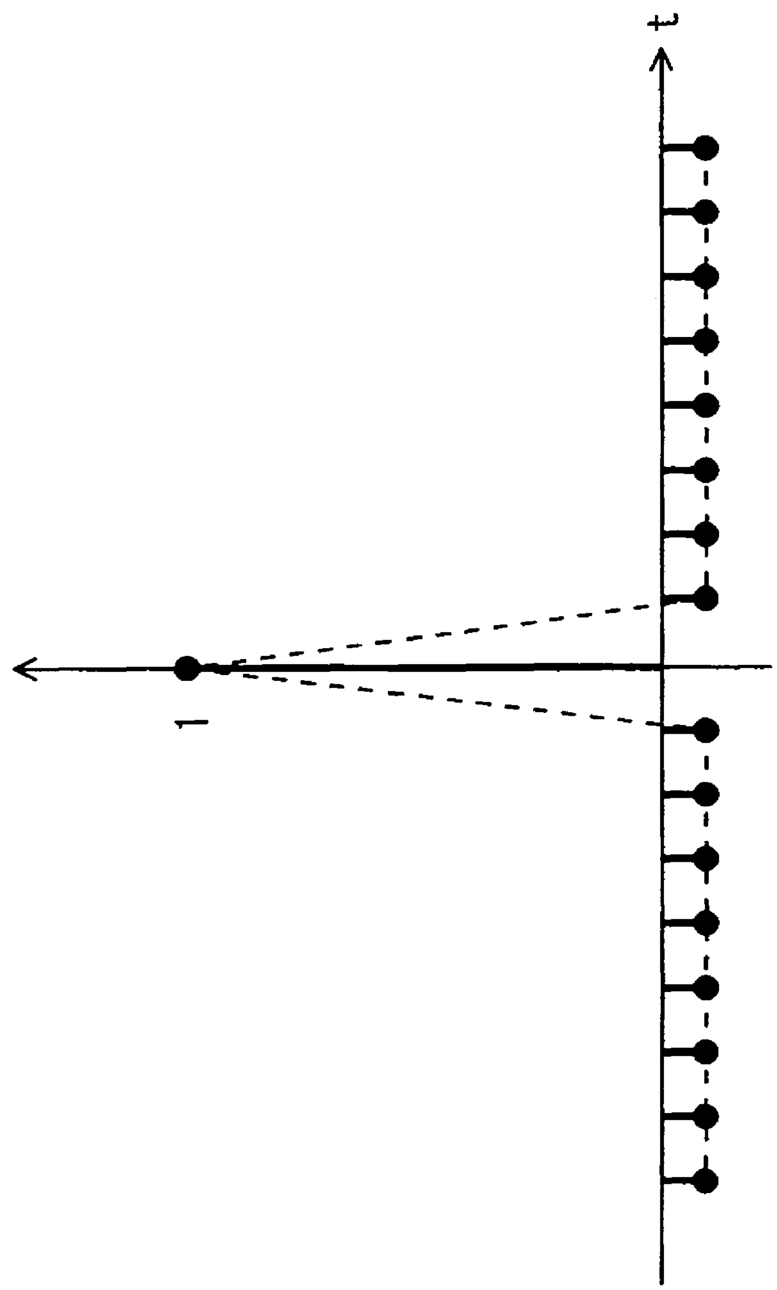
FIG. 22 is a graph showing a correlation value string obtained by autocorrelating a PN symbol string.

FIG. 22 is a graph showing a correlation value string obtained by autocorrelating a PN symbol string.

As shown in FIG. 22, the correlation value string obtained by autocorrelating the PN symbol string has a characteristic in which all correlation values other than the peak appearing when the autocorrelativity is high are a known constant value. In other words, the correlation value string obtained by autocorrelating the PN symbol string is composed of two types of values, namely the peak value and all other values.

Figure 6:
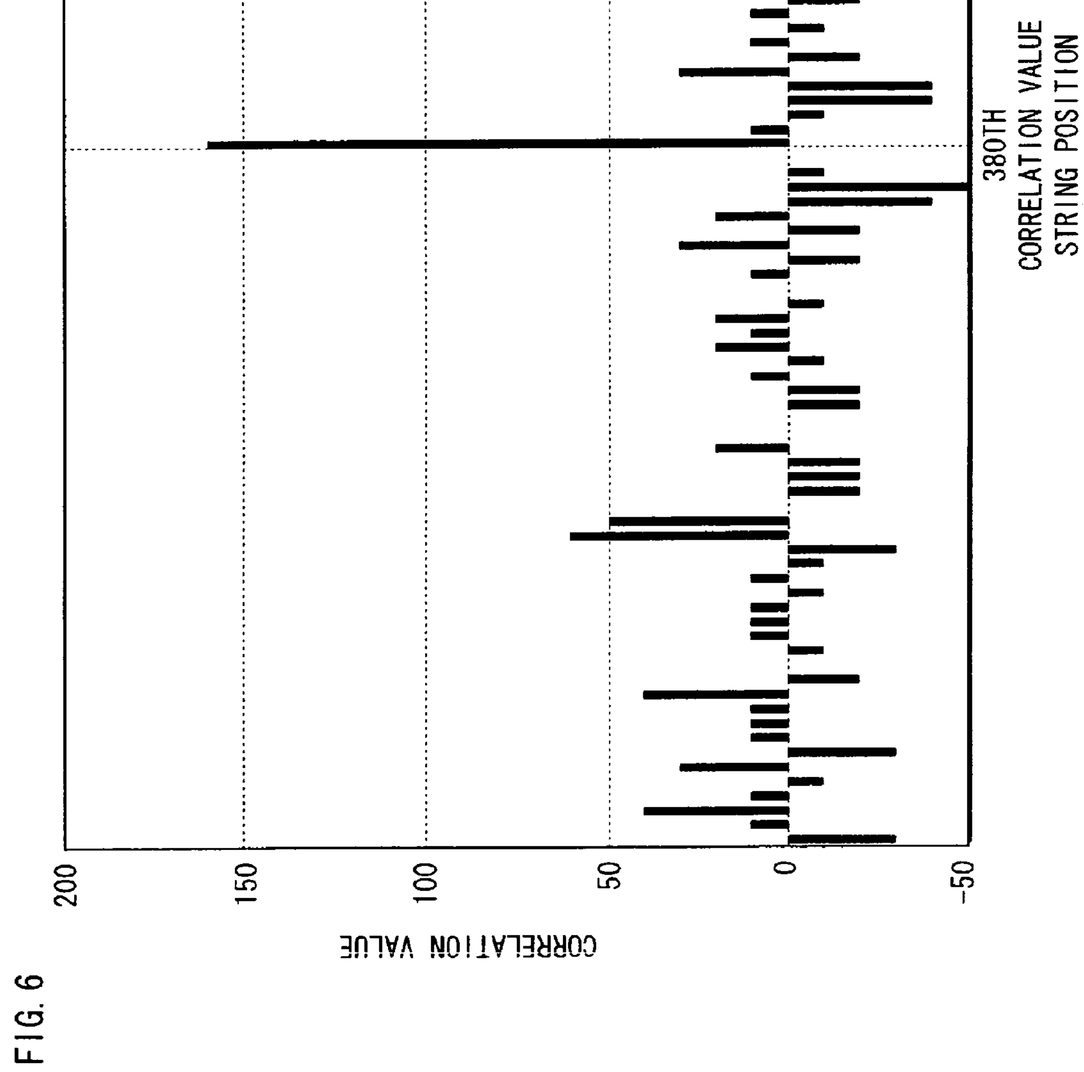
FIG. 6 is a graph showing a correlation value string obtained by cross-correlating a known first field sync segment and a reference signal value string which is a part of a PN511 symbol string.

In contrast, a transmitted transmission signal includes not only the PN symbol string, but also arbitrary data symbol strings before and after, and when the PN symbol string is detected as a reference symbol string, the result of a correlation between the transmission signal and the reference symbol string is a value string that is clearly different from the above-mentioned correlation value string obtained by autocorrelating the PN symbol string, and as in FIG. 6 which is mentioned later, correlation values other than the peak value become arbitrary values that differ according to their position (i.e., correlation noise).

Also, transmission signals are largely affected by mainly noise and multipath on terrestrial broadcasting channels and the like. When a transmission signal picks up noise etc. on the channel and is received by a reception device as an input signal, effects of the noise appear in the correlation value string of the input signal. However, effects of the noise component in the input signal are reduced due to being superimposed between input signal values by a correlation operation, and performing detection using peak detection results in two or more signal sections enables further reduction of the effects of the noise components.

Input signals that are affected by multipath and received by a reception device include not only the directly transmitted signal, but also signals that have reflected off of various objects such as buildings. Such signals from reflex pathways have different amplitudes and arrival times from the direct pathway signal. In other words, the input signal is a composited signal including the direct pathway signal and a number of reflex pathway signals.

The effects of such multipath can be reduced by an equalization filter or the like, and since it is advantageous in equalization to generate a filter coefficient by a training method using a synchronization signal included in the input signal, it is necessary to detect the synchronization signal before performing equalization, therefore making it necessary in this case to detect the synchronization signal from the signal affected by multipath.

Consequently, when a correlation operation is performed to detect a synchronization signal in the input signal, not only does the resulting correlation value string include effects of noise and multipath on the channel, but effects of the above-mentioned correlation noise also make detection of the synchronization signal difficult, and may lead to a false detection of the synchronization timing.

For example, in the case of multipath, if the amplitude of a reflex pathway signal approaches the amplitude of the direct pathway signal, similar signals having different arrival times are received collectively, and a correlation result of the received signals will therefore have two or more peaks with similar amplitudes, thereby making it necessary to discern which peak to detect as the synchronization position. Here, a signal whose path has a stronger reception power is thought to have a higher peak since peak amplitude indicates correlativity, and therefore detecting the synchronization signal in the direct pathway signal that has the highest reception power etc. is performed by detecting the highest peak position as the synchronization position.

However, as the peak values change due to noise etc., the magnitude relation between peaks when there is no noise is lost, and there is the possibility, when there is noise, of falsely detecting a peak other than what would be the maximum peak if there were no noise. This noise includes not only noise on the channel, but also correlation noise from the correlation operation used in the detection, and there is an even further increased possibility of making a false detection since both types of noise cannot be separated. Even if the effects of this noise are mitigated by performing synchronization detection using the above-mentioned result of detecting two or more peaks or the like, effects of this noise will still remain.

The present invention therefore proposes a method of further reducing effects of noise and multipath by suppressing correlation errors corresponding to correlation noise in noise that affects detection of the synchronization signal by a correlation operation.

First, since correlation noise is generated due to arbitrary data symbol strings before and/or after the reference symbol string, a known symbol string is provided in the transmission signal between the reference signal string and data symbol strings before and/or after the reference signal string. When a reception device receives such a transmission signal as an input signal, and the input signal and the reference symbol string are cross-correlated, a known correlation value string, that is, a correlation error value string, will appear before and/or after correlation peaks in the resulting correlation value string. The correlation values of this correlation error value string can be arbitrary values, but differ from unpredictable correlation noise. Note that if the known symbol string is not provided, a part of the original reference symbol string can be used as the known symbol string by shortening the reference symbol string. However, the magnitude of the peaks will be reduced and correlation values other than the peaks will be increased when the reference symbol string is shortened, but this effect may be ignored.

By suppressing (e.g., removing) this correlation error value string from the correlation value string obtained by correlating the input signal and the reference signal, portions of the correlation value string in the vicinity of the peaks appear to include only two type of values as in a correlation value string obtained by autocorrelation, and even if channel noise is added to the input signal, the suppression of the correlation error value string makes it much more difficult to make a false detection, compared with when correlation noise is included. In other words, it is possible to increase performance for detecting the synchronization signal. Since correlation errors may change depending on the position of the correlation value on the correlation value string, correlation errors can be obtained according to positions on the correlation value string, and a peak or the like may be used as a reference for such positions. Detecting a peak after such compensation makes it possible to obtain the position of the synchronization signal without correlation errors.

The following considers a case of losing the above-mentioned magnitude relation between peaks due to correlation error in the correlation value string of the input signal as a result of the effects of multipath, and falsely detecting a synchronization signal. Since the input signal is a composite signal including signals from the direct pathway and reflex pathways, and the correlation operation is a linear operation, the correlation value string of the input signal becomes a composite value string including the correlation value strings of the direct pathway signal and the reflex pathway signals. The direct pathway signals and the reflex pathways signals differ with respect to amplitude and arrival time, and since these original signals without these differences are the same transmission signals, substituting the amplitude and time of the correlation value string for the direct pathway signal with the amplitude and time of that for a reflex pathway signal results in the correlation value string for the reflex pathway signal. Therefore in the correlation value string of the input signal, a peak in the correlation value string for the direct pathway signal includes a correlation error at a corresponding time on the correlation value string for the reflex pathway signal, or on the other hand, a peak of the correlation value string for the reflex pathway signal includes a correlation error at the corresponding time on the correlation value string for the direct pathway signal.

For this reason, as the amplitudes of the reflex pathway signals approach the amplitude of the direct pathway signal as mentioned above, correlation errors cause the peaks of the reflex pathway signals having a smaller reception power to be bigger than the peak of the direct pathway signal having a greater reception power, whereby the magnitude relation is lost, and the possibility of a false detection increases.

Therefore, several peaks are obtained from the correlation value string of the input signal, a correlation error with respect to each of the peaks is obtained by utilizing the fact that each of the peaks is a part of a correlation value string having a correlation error, and each of the peaks is better compensated by suppressing the correlation errors resulting from the addition of other peaks. Given that it is difficult to obtain a right peak without a correlation error before compensation since each of the peaks includes a correlation error corresponding to another peak, it becomes difficult to properly obtain the correlation error of the peak; assuming that the correlation error with respect to the right peak is random such as noise at the position corresponding to the peak, the positions of other peaks with respect to a certain peak become arbitrary, and when a number of correlation errors with respect to other peaks are composited on the certain peak, the correlation errors are composited at random positions, whereby not only the effects of synchronous addition noise decrease, but also correlation errors versus the peaks are small as shown in, for example, FIG. 6, whereby their effects may be ignored.

Detecting the peak after compensation enables synchronization detection with reduced effects from multipath and correlation errors, and more precise detection than conventional synchronization detection.

Functional Structure of the Sync Detection Unit 23

Next is a detailed description of a functional structure of the sync detection unit 23 of embodiment 1.

Detailed descriptions of functional units other than the sync detection unit 23 have been omitted since they are the same as those used in conventional technology.

Figure 2:
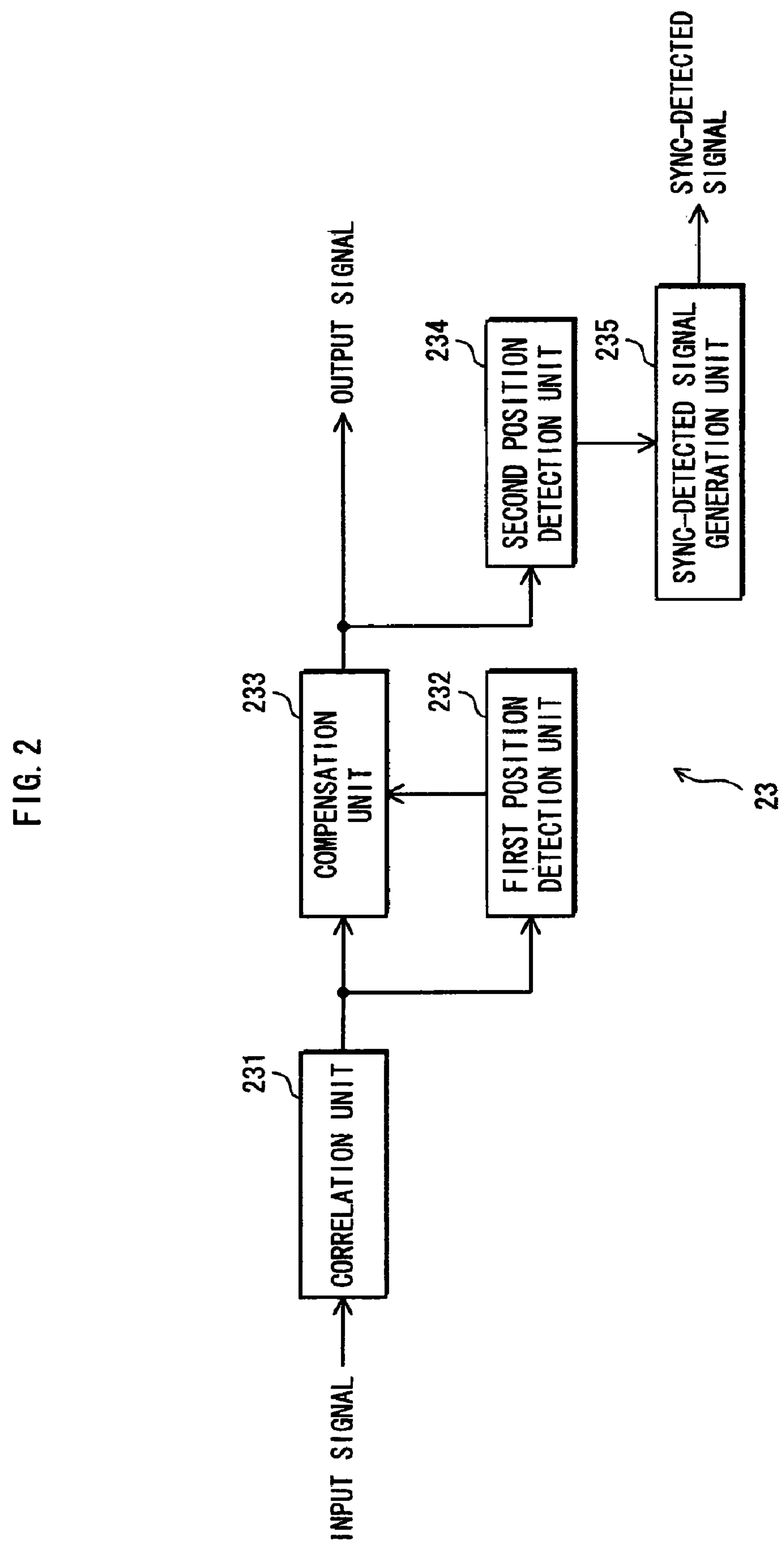
FIG. 2 shows a functional structure of a sync detection unit according to embodiment 1.

FIG. 2 shows the functional structure of the sync detection unit 23.

The sync detection unit 23 includes a correlation unit 231, a first position detection unit 232, a compensation unit 233, a second position detection unit 234 and a sync-detected signal generation unit 235.

Functions of these units are realized by software and hardware in cooperation.

The correlation unit 231 cross-correlates a sequentially input symbol string with a known symbol string (hereinafter, simply called a reference symbol string).

Figure 3:
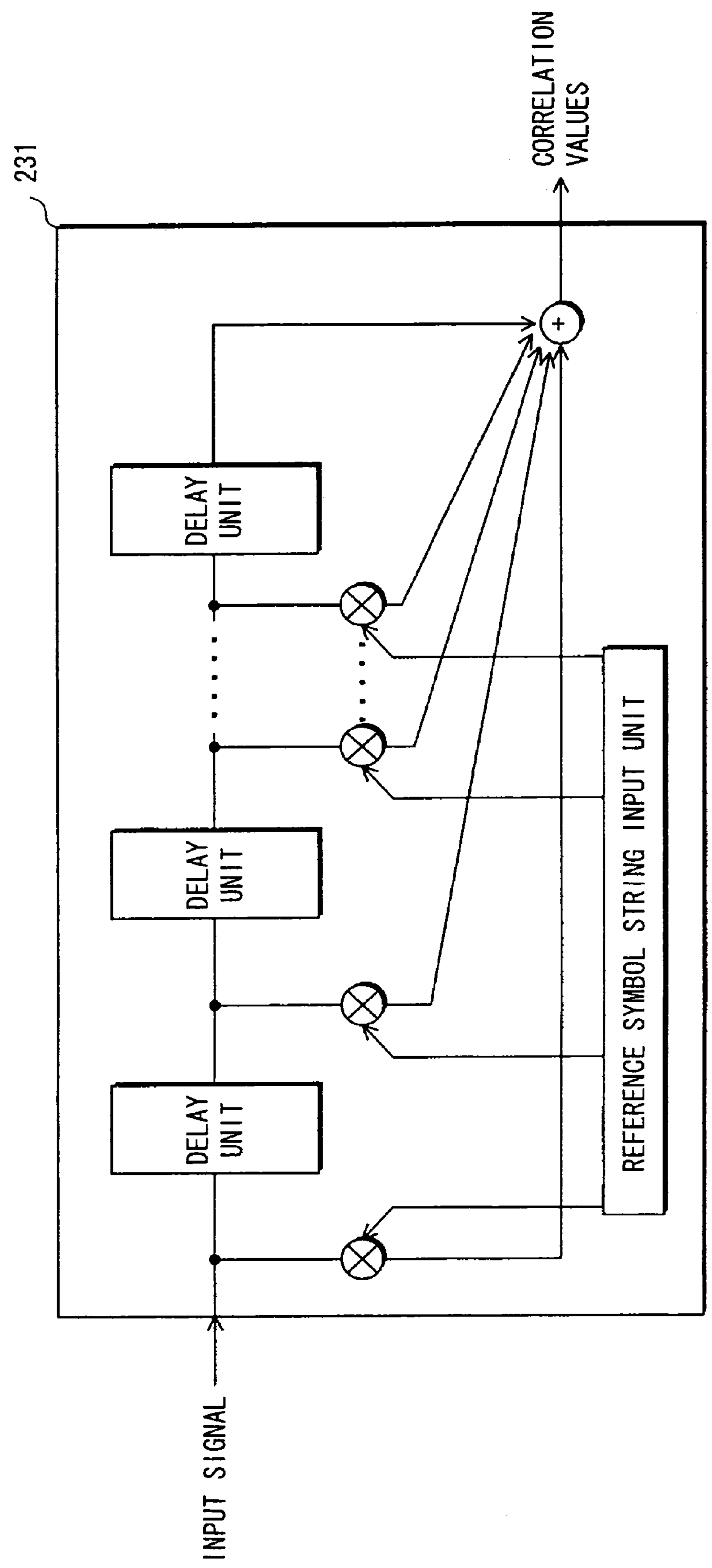
FIG. 3 shows an exemplary structure of a correlation unit.

FIG. 3 shows an exemplary structure of a correlation unit.

The correlation unit 231 shown in FIG. 3 uses a delay unit constituted from a shift register or the like to delay symbols in a symbol string (i.e., the input signal) 1 symbol each, thereby shifting the verification position of the symbol string and the reference symbol string input to the reference symbol string input unit, performs a convolution operation, and sequentially outputs the resulting correlation values. Note that a detailed description of the structure shown in FIG. 3 has been omitted since it is the same as a conventional correlation device.

In the present embodiment, a part of the training signal is used as the reference symbol string.

The first position detection unit 232 detects a position and value of a correlation value viewed as the maximum or local maximum in the string of correlation values (hereinafter, simply referred to as correlation value string) that is obtained as a result of the correlation unit 231 cross-correlating the input symbol string and the reference symbol string.

Note that the position mentioned above may be either an absolute position or a relative position, and the correlation value may also be an absolute value or a relative value.

Figure 5:
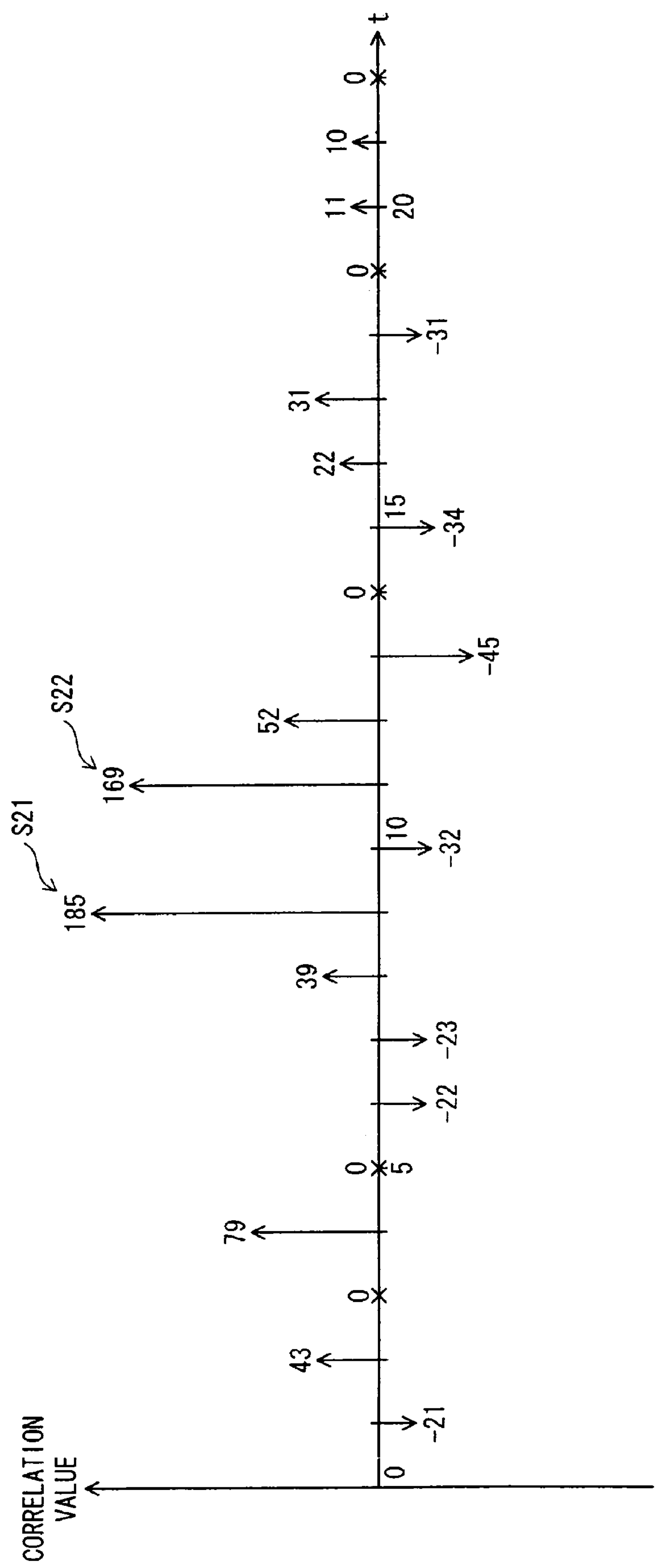
FIG. 5 is a graph showing an exemplary correlation value string obtained as a result of cross-correlating an input symbol string and a reference symbol string.

FIG. 5 is a graph showing an exemplary correlation value string obtained as a result of the correlation unit 231 correlating the input symbol string and the reference symbol string.

When a single-carrier VSB modulated signal is received as a terrestrial broadcast, symbol strings obtained from the received signal are often distorted due to the effects of white noise and multipath.

When taking one field-worth of correlation values between a symbol string affected by white noise and multipath and a field sync symbol string (i.e., reference symbol string), the resulting correlation value string will include more than one correlation value that can be viewed as the maximum or local maximum, which does not happen when taking one field-worth of correlation values between a symbol string not affected by white noise or multipath and a field synchronization symbol string (i.e., reference symbol string).

This phenomenon occurs due to the addition of error components from multipath and white noise to correlation values at positions other than the true maximum (hereinafter, called correlation error values, and mentioned in detail later).

As shown in FIG. 5, the first position detection unit 232 views correlation value=185 (S21) at T=9 and correlation value=169 (S22) at T=11 as the maximum and the local maximum, and detects T=9 and T=11.

Here, the maximum is the maximum absolute value, and the local maximum is the absolute value that results from a multipath interference component and white noise, and is smaller than the correlation value viewed as the maximum.

As such, there may be two or more correlation values viewed as local maxima. (Hereinafter, the maximum of the correlation values is called a "maximum correlation value," and the local maximum of the correlation values is called a "local maximum correlation value.")

Note that the first position detection unit 232 may detect the maximum or the local maximum before the correlation values become absolute values, or from correlation values raised to an arbitrary power instead of absolute values.

The compensation unit 233 considers the correlation value at the position detected by the first position detection unit 232 on the correlation value string to be the basis, and normalizes a predetermined number of correlation values at positions before and after the detected position. The compensation unit 233 then performs compensation by associating the basis position of the normalized correlation value string with a maximum position of a prestored normalized correlation error value string, and suppressing, from correlation values at positions other than the basis position of the normalized correlation value string, correlation error values at positions on the correlation error value string that correspond to the above positions.

Details of the compensation processing performed by the compensation unit 233 and correlation error value string are mentioned later.

Note that the compensation unit 233 may store a correlation error value string that has not been normalized, or may normalize the correlation error value string by, for example, considering the maximum correlation value or local maximum correlation value detected by the first position detection unit 232 to be the basis. It is also possible for the correlation error value string to be obtained by an operation as needed, whereby the compensation unit 233 needs not prestore the correlation error value string.

The second position detection unit 234 detects a single position of a correlation value to be viewed as the maximum correlation value on the correlation value string compensated by the compensation unit 233.

Note that the second position detection unit 234 may detect at least one local maximum, or may detect a correlation value, or a position or value relative to a certain correlation value that has been considered to be the basis.

The sync-detected signal generation unit 235 generates and outputs a sync-detected signal based on a position in the correlation value string detected by the second position detection unit 234.

Note that the sync-detected signal generation unit 235 may generate an arbitrary signal other than the synchronization signal, based on the correlation value or the position in the correlation value string detected by the second position detection unit 234.

Correlation Error Value String

Next is a description of the correlation error value string.

FIG. 6 is a graph showing a part of a correlation value string obtained by considering 32 symbols in a PN511 symbol string (from the 345th symbol to the 376th symbol) to be a reference signal value string, and sequentially correlating a first field sync segment that has not been effected by white noise or multipath with the reference signal value string while shifting a verification position by one symbol from a lead position of the first field sync segment.

As shown in FIG. 6, the maximum correlation value is at the 380th position in the correlation value string, which has a value of 160. Correlation values at positions other than the maximum are called correlation error values.

By using a part of the other know signal value string as the reference signal value string for obtaining a correlation as mentioned above, the correlation value string obtained by correlating the signal value string before and after the part and including the part with the reference signal value string results in known values. In other words, the compensation unit 233 can use the correlation error values as known values.

Compensation Processing 1

Next is a description of compensation processing performed by the compensation unit 233.

In order to facilitate understanding of processing content in the compensation processing described below, the compensation unit 233 is assumed to prestore the correlation error value string shown in FIG. 7 and FIG. 8, and only a correlation value string of the same length as the stored correlation error value string is targeted for compensation.

Figure 7:
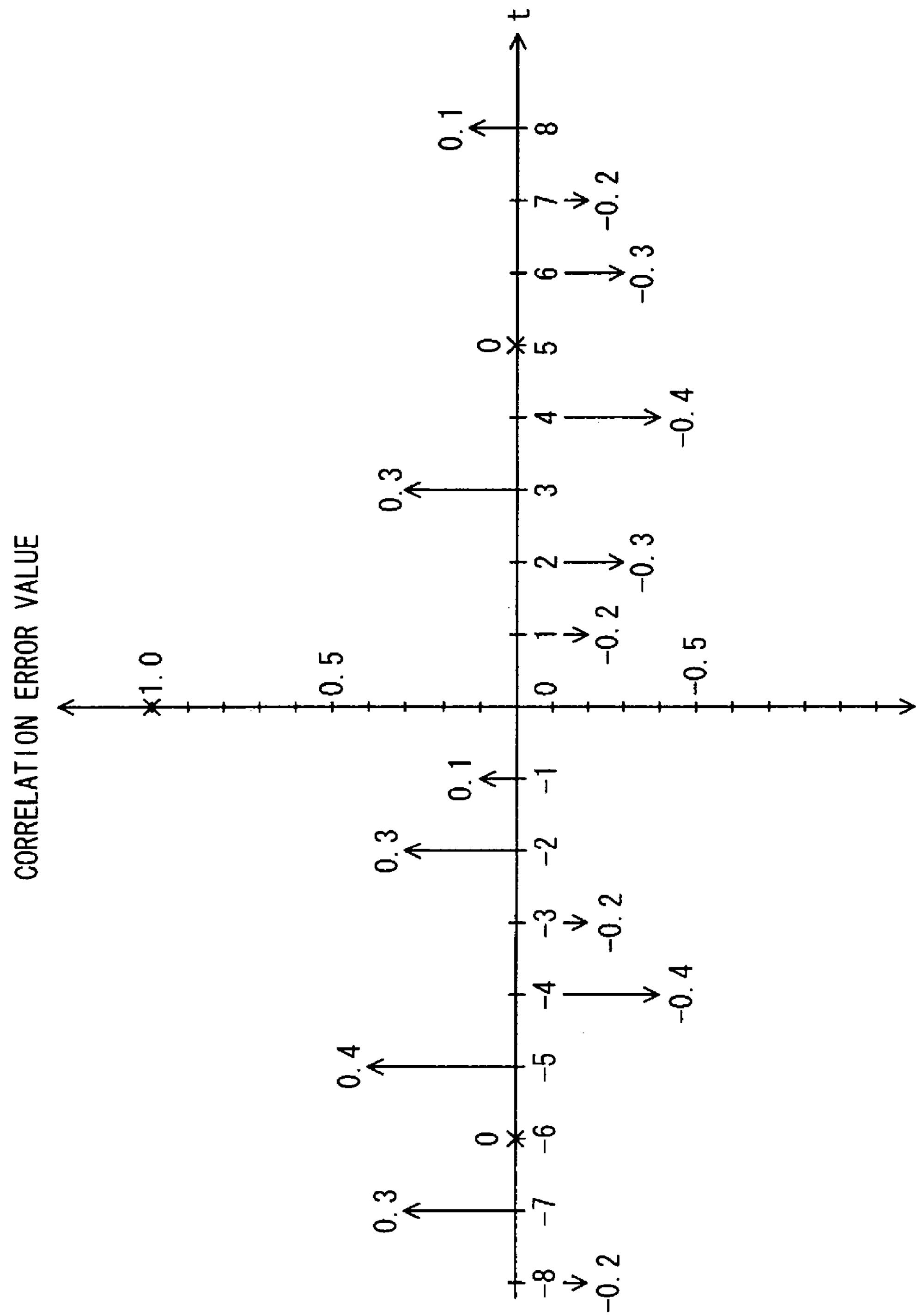
FIG. 7 is an exemplary graph showing a correlation error value string obtained by cross-correlating the known first field sync segment and the reference signal value string which is a part of the PN511 symbol string, where the correlation error value string has been normalized and t=0 is a position of a maximum.

FIG. 7 is a graph showing correlation error values from a correlation error value string obtained by correlating a reference symbol string, which is apart of a training signal, with a part of a first field sync segment, and performing normalization considering the maximum correlation value to be the basis, where the position of the maximum correlation value is t=0, and the graphed correlation errors values are in the range of t=−8 to t=8.

Figure 8:
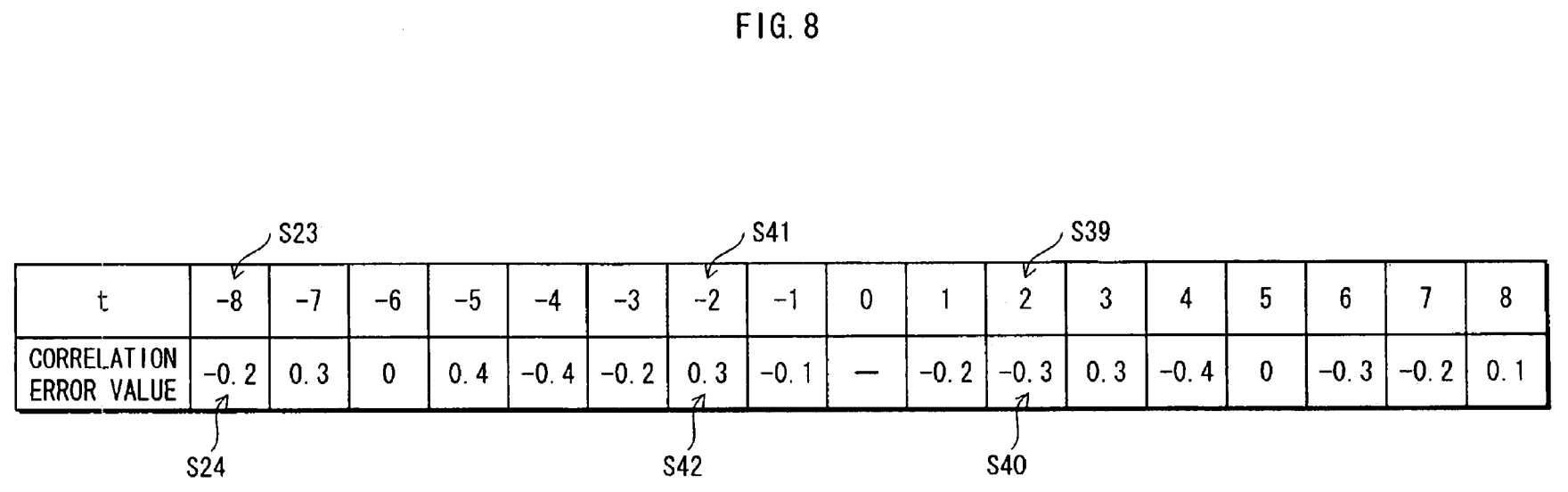

FIG. 8 shows the correlation error value string of FIG. 7 as a table.

First, when the first position detection unit 232 views correlation value=185 (S21) at T=9 in FIG. 5 as the maximum correlation value or the local maximum correlation value, the compensation unit 233 receives the position information, considers correlation value=185 (S21) at T=9 to be the basis, and normalizes the correlation value string.

FIG. 9A is a table showing part of the correlation value string normalized considering correlation value=185 (S21) at T=9 to be the basis.

After normalizing the correlation value string, the compensation unit 233 performs compensation by suppressing the correlation error values of the above correlation error value string from respective correlation values of the normalized correlation value string.

In other words, the compensation unit 233 performs compensation by suppressing, from the correlation values on the normalized correlation value string shown in FIG. 9A, correlation error values that are on the correlation error value string shown in FIG. 8 and correspond to the positions of the correlation values.

For example, correlation error value=−0.2 (S24) at t=−8 (S23) in the correlation error value string table shown in FIG. 8 is subtracted from correlation value=−0.12 (S26) at t=−8 (S25) in the correlation value string table show in FIG. 9A.

As a result, the correlation value at t=−8 (S25) becomes −0.12−(−0.2)=0.08.

FIG. 9B is a table showing the correlation value string of FIG. 9A after compensation processing has been performed.

As is clear from the table shown in FIG. 9B, correlation value=−0.3 (S40) at t=2 (S39) in the correlation error value string table of FIG. 8 has been suppressed from correlation value=0.91 (S28) at t=2 (S27) of FIG. 9A by the above compensation, thereby becoming 0.91−(−0.3)=1.21 (S29), which is larger than correlation value=1.0 at t=0 (S30).

This shows that correlation value=169 (S22) at T=11 in FIG. 5 is larger than correlation value=185 (S21) at T=9 after compensation, and in this case, the second position detection unit 234 views correlation value=169 (S22) at T=11 in the compensated correlation value string as the maximum correlation value, and detects the position thereof.

Also, when the first position detection unit 232 views correlation value=169 (S22) at T=11 in FIG. 5 as the maximum correlation value or local maximum correlation value and detects the position thereof, compensation unit 233 may perform compensation processing after normalizing the correlation value string considering correlation value=169 (S22) at T=11 to be the basis.

FIG. 10A is a table showing part of the correlation value string normalized considering correlation value=169 at T=11 to be the basis.

As is clear from the table shown in FIG. 1A, correlation value=1.09 (S35) at t=−2 (S34) is larger than correlation value=1.0 (S33) at t=0 (S32).

FIG. 10B is a table showing the correlation value string compensated by the compensation unit 233.

As is clear from the table shown in FIG. 10B, there are no values greater than correlation value=1.0 (S37) at t=0 (S36) in the compensated correlation value string, and the pre-compensation correlation value=1.09 (S35) at t=−2 (S34) in FIG. 10A has been compensated to 0.79 (S38) by suppressing correlation value=0.3 (S42) at t=−2 (S41) in the correlation error value string table shown in FIG. 8.

In this case, the second position detection unit 234 views the correlation value (S22) at T=11 in the compensated correlation value string output by the compensation unit 233 as the maximum, and detects a position thereof.

Note that the second position detection unit 234 may view a correlation value at a position other than T=9 or T=11 as the maximum correlation value or local maximum correlation value, detect the position thereof, whereafter the above compensation processing is performed; or the compensation processing may be repeatedly performed an arbitrary number of times. Also, the compensation may be performed using an absolute value or value raised to an arbitrary power.

Compensation Processing 2

The present invention may perform compensation processing as described below.

Figure 11:
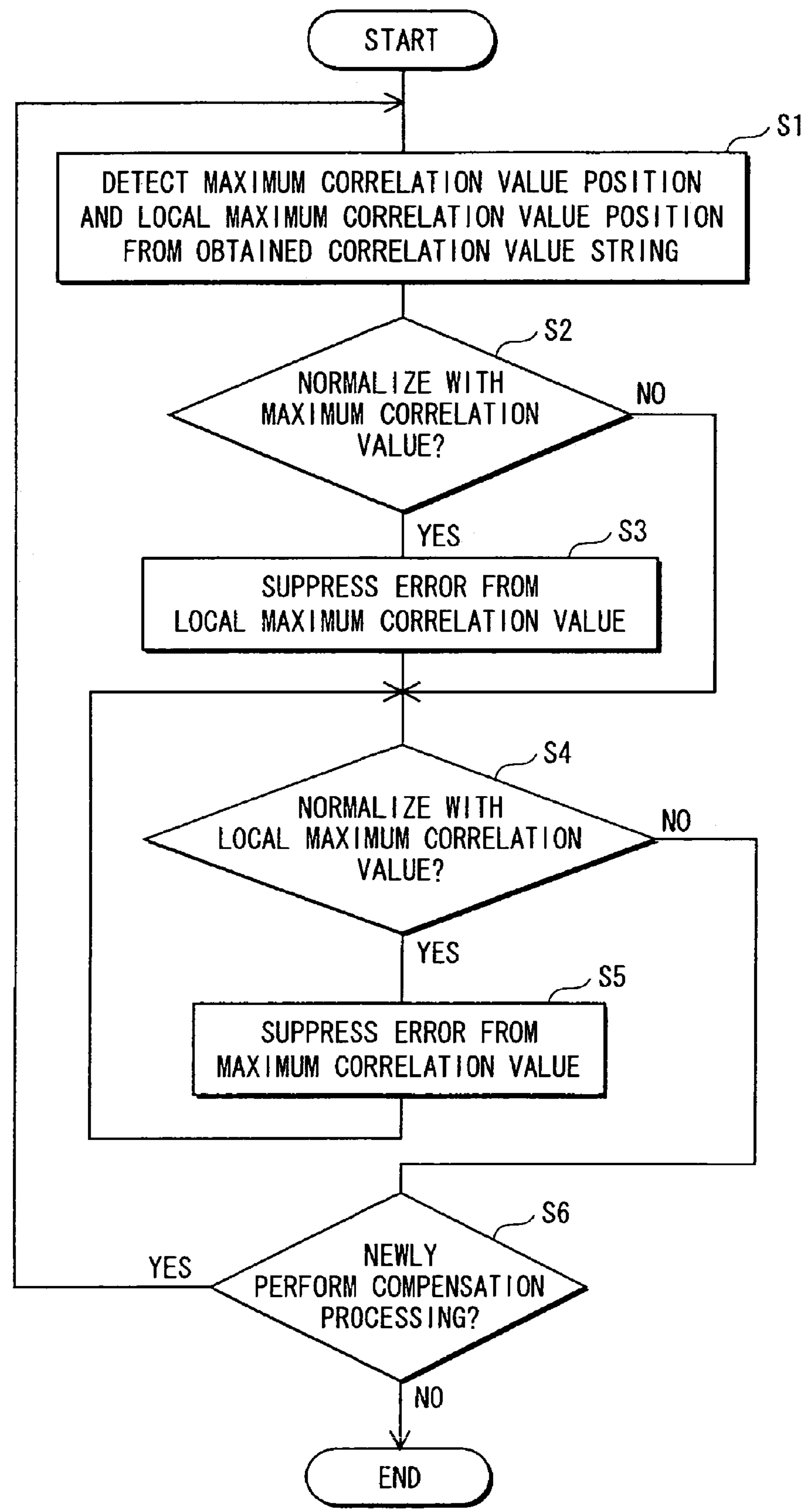
FIG. 11 is a flowchart for describing operations of compensation processing 2.

FIG. 11 is a flowchart for describing operations of compensation processing 2.

First, the first position detection unit 232 detects a first position in a correlation value string to be viewed as the maximum correlation value, and a second position in the correlation value string to be viewed as the local maximum correlation value (step S1).

Next, the compensation unit 233 judges whether to normalize the correlation value string considering the correlation value viewed as the maximum correlation value to be the basis (step S2). If the judgment is affirmative (step S2:YES), the compensation unit 233 performs compensation by suppressing the correlation error value on the above-mentioned correlation error value string at the position corresponding to the second position, from the correlation value at the second position in the normalized correlation value string (step S3). Processing then moves to step S4.

Also, if the judgment is negative (step S2:NO), processing moves to step S4.

In step S4, the compensation unit 233 judges whether to normalize the correlation value string considering the correlation value viewed as the local maximum correlation value to be the basis (step S4).

If the judgment is affirmative (step S4:YES), the compensation unit 233 performs compensation by suppressing the correlation error value on the above-mentioned correlation error value string at the position corresponding to the first position, from the correlation value at the first position in the normalized correlation value string (step S5). Processing then returns to step S4.

Also, if the judgment is negative (step S4:NO), processing moves to step S6.

Processing returns to step S1 if newly performing compensation processing (step S6:YES); otherwise, compensation processing ends (step S6:NO).

The following is a specific description of compensation processing 2 using FIG. 5, FIG. 8 to FIG. 10, and FIG. 12.

If the first position detection unit 232 detects correlation value=185 (S21) at T=9 in FIG. 5 as the position of the maximum correlation value (i.e., the first position), and correlation value=169 (S21) at T=11 as the position of the local maximum correlation value (i.e., the second position), the compensation unit 233 first judges whether to perform normalization considering correlation value=185 (S21) at T=9 (the first position) to be the basis.

If the compensation unit 233 normalizes the correlation value string considering the first position to be the basis, the resulting correlation value string is as shown in the correlation value string table of FIG. 9A.

Next, the compensation unit 233 performs compensation by suppressing correlation error value=−0.3 (S40) at t=2 (S39) on the correlation error value string in FIG. 8, from correlation value=0.91 (S28) at t=2 (S27) which is the position corresponding to T=11 (the second position) in the correlation value string table in FIG. 9A.

FIG. 12A is a table showing a correlation value string resulting from the correlation value string in FIG. 9A being compensated by compensation processing 2.

As is clear in FIG. 12A, the correlation value at t=2 (S43) is 1.21 (S44), which is greater than the normalization basis value 1.0 (S45), that is, the correlation value viewed as the maximum correlation value.

The second position detection unit 234 therefore detects T=11 in FIG. 5 as the position of the maximum correlation value.

Also, if the compensation unit 233 judges to perform normalization considering the second position rather than the first position to be the basis, the resulting correlation value string is as shown in the correlation value string table in FIG. 10A.

The compensation unit 233 performs compensation by suppressing correlation error value=0.3 (S42) at t=−2 (S41) on the correlation error value string in FIG. 8, from correlation value=1.09 (S35) at t=−2 (S34) in the table shown in FIG. 10A, which corresponds to T=9 (the first position).

FIG. 12B is a table showing a correlation value string resulting from the correlation value string in FIG. 10A being compensated by compensation processing 2.

As is clear in FIG. 12B, the correlation value at t=−2 (S46) is 0.79 (S47), which is smaller than the normalization basis value 1.0 (S48), that is, the correlation value viewed as the maximum correlation value.

The second position detection unit 234 therefore detects T=11 as the position of the maximum correlation value.

Note that it is assumed that two or more correlation values to be viewed as local maximum correlation values will be detected, and compensation may be performed by normalizing the correlation value string with the correlation value viewed as the maximum correlation value, and suppressing, from the correlation values at the plurality of second positions, the correlation error values at positions on the correlation error value string corresponding to the second positions, or normalization may be performed considering each of the local maximum correlation values to be the basis, and compensation may be performed by suppressing correlation error values from corresponding correlation values at the first position or second positions corresponding to local maximum correlation values other than the above-mentioned local maximum correlation values. Compensation may be performed by suppressing correlation values at positions other than the first or second position, and compensation processing may be repeatedly performed an arbitrary number of times. Furthermore, the correlation error value string may be normalized considering a correlation value at the detected first or second position to be the basis, without normalizing the correlation value string, or obtaining correlation error values to be used in the suppression. Also, compensation may be performed using absolute values or values raised to an arbitrary power.

Compensation Processing 3

The present invention may perform the following compensation processing.

Figure 13:
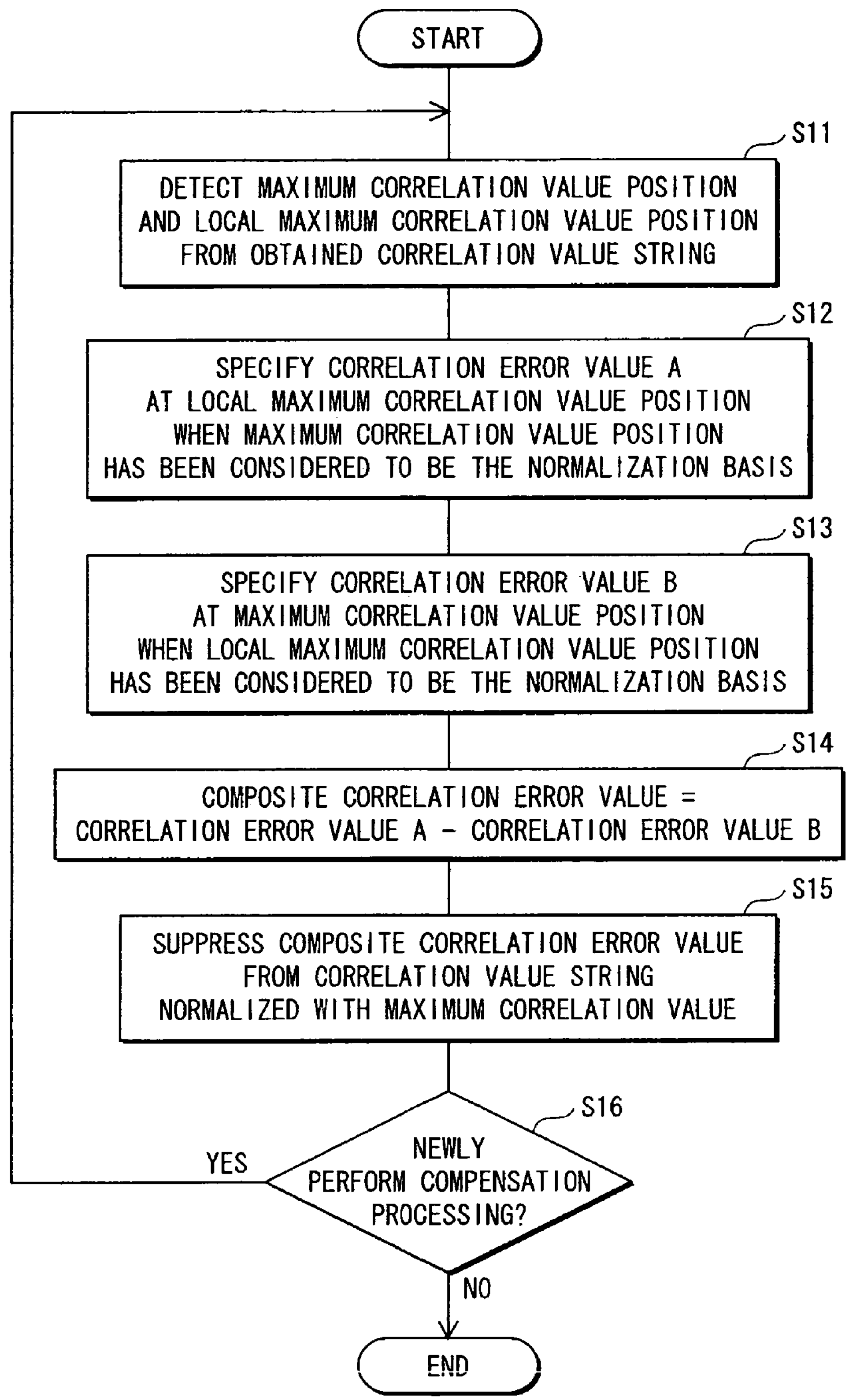
FIG. 13 is a flowchart for describing operations of compensation processing 3.

FIG. 13 is a flowchart for describing operations of compensation processing 3.

The maximum correlation value and local maximum correlation value are as described in the above compensation processing 2.

First, the first position detection unit 232 detects a first position in a correlation value string to be viewed as the maximum correlation value and a second position in the correlation value string to be viewed as the local maximum correlation value (step S11). Note that the first position detection unit 232 may detect two or more local maximum correlation values.

Next, if the first position is considered to be the basis position, the compensation unit 233 specifies a correlation error value (correlation error value A) at a position in the above-mentioned correlation error value string that corresponds to the second position in the correlation value string (step S12).

If the second position is considered to be the basis position, the compensation unit 233 then specifies a correlation error value (correlation error value B) at a position in the correlation error value string corresponding to the first position in the correlation value string (step S13).

The compensation unit 233 obtains a composite correlation error value by subtracting the correlation error value B specified in step S13 from the correlation error value A specified in step S12 (step S14).

The compensation unit 233 performs compensation by suppressing the composite correlation error value obtained in step S14 from the correlation value string normalized considering the correlation value viewed as the maximum correlation value to be the basis (step S15).

Processing returns to step S1 if compensation processing is to be newly performed after step S15 (step S16:YES); otherwise (step S16:NO), compensation processing ends.

Next is a specific description using FIG. 5, FIG. 8, FIG. 9 and FIG. 14.

If the positions at correlation value=185 (S21) at T=9 and correlation value=169 (S22) at T=11 in FIG. 5 are detected as the maximum correlation value and local maximum correlation value (i.e., the first position and second position) respectively, the compensation unit 233 specifies the correlation error value A at the position in the correlation error value string shown in FIG. 8 corresponding to T=11 (the second position) if T=9 (the first position) is considered to be the basis position. In other words, the correlation error value A is correlation error value=−0.3 (S40) at t=2 (S30) in the correlation error value string shown in FIG. 8.

Also, the compensation unit 233 specifies the correlation error value B at the position in the correlation error value string shown in FIG. 8 corresponding to T=9 (the first position) if T=11 (the second position) is considered to be the basis position. In other words, the correlation error value B is correlation error value=0.3 (S42) at t=−2 (S41) in the correlation error value string shown in FIG. 8.

Next, the compensation unit 233 obtains the composite correlation error value. Since the composite correlation error value equals the correlation error value A minus the correlation error value B, the composition correlation error value is −0.3−(0.3)=−0.6.

The compensation unit 233 then normalizes the correlation value string considering the correlation value at the first position to be the basis. FIG. 9A shows the correlation value string normalized considering the correlation value at T=9 to be the basis. The compensation unit 233 then performs compensation by suppressing the composite correlation error value from correlation values at positions other than the basis position (t=0) in the normalized correlation value string shown in FIG. 9A.

FIG. 14 is a table showing the correlation value string shown in FIG. 9A after having been compensated by compensation processing.

As a result, the correlation value at t=2 (S49) in FIG. 14 is 0.91−(−0.6)=1.51 (S50), which is the largest value on the compensated correlation value string.

The second position detection unit 234 therefore detects T=11, which is the position at t=2 (S49), as the position of the maximum correlation value.

Note that the compensation unit 233 may perform compensation by performing normalization considering at least one detected second position to be the basis and suppressing the obtained composite correlation error value from the correlation value string, may obtain the composite error value using two or more correlation error values corresponding to the plurality of second positions, may perform compensation by suppressing a composite correlation error value from corresponding correlation values other than the first and second positions, and may repeatedly perform compensation processing an arbitrary number of times. Furthermore, the compensation unit 233 may perform compensation by normalizing the correlation error value string considering the at least one correlation value at the detected first and second positions to be the basis without normalizing the correlation value string, and obtaining a composite correlation error value to be used in the suppression. Also, the compensation unit 233 may perform compensation using absolute values or values raised to an arbitrary power.

Variation 1

The sync detection unit of the present invention may have the following structure.

Figure 15:
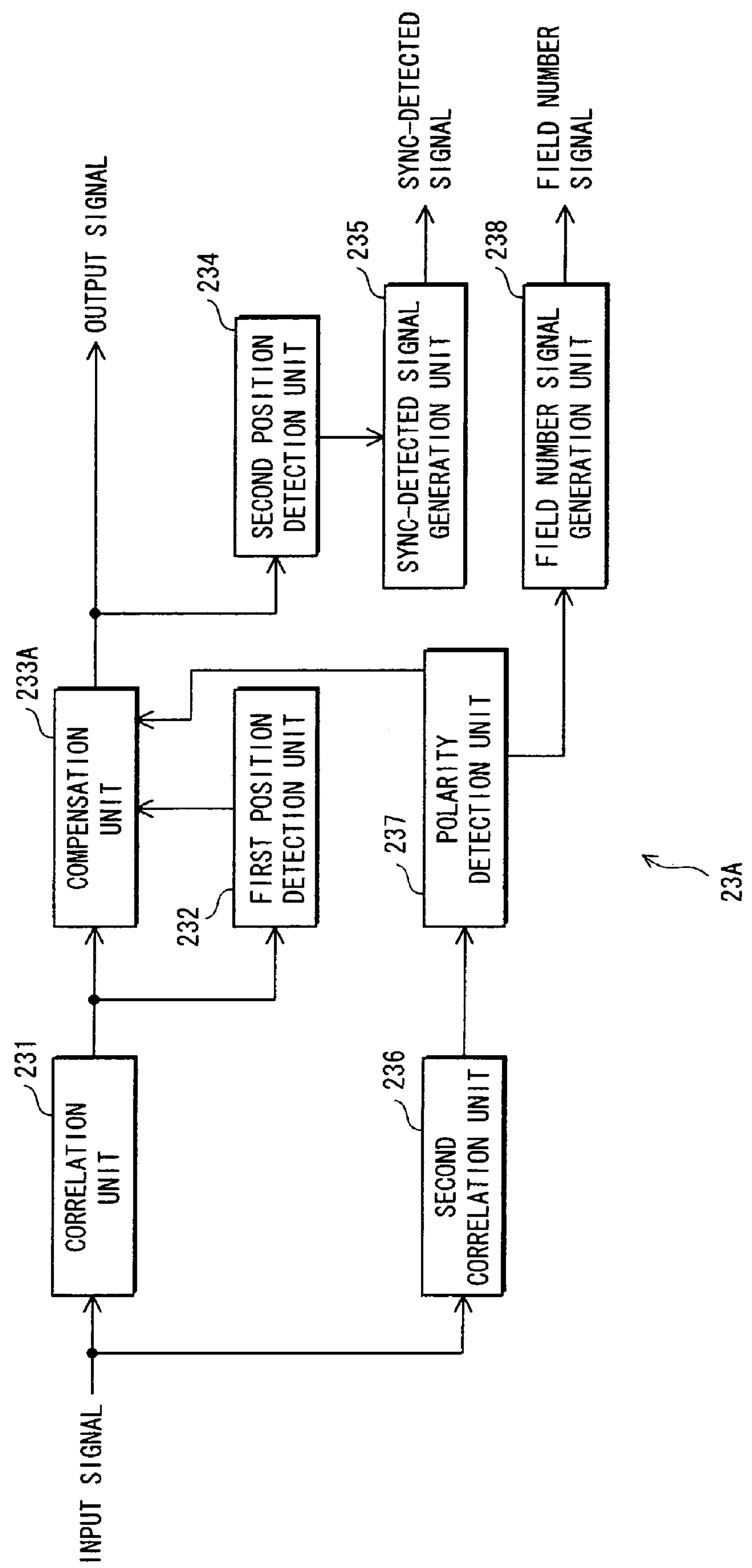
FIG. 15 shows a functional structure of a sync detection unit according to variation 1.

FIG. 15 shows a functional structure of the sync detection unit of variation 1.

Function units of a sync detection unit 23A in FIG. 15 that are the same as in the above-mentioned sync detection unit 23 have been given the same characters, and descriptions thereof have been omitted.

The sync detection unit 23A differs from the sync detection unit 23 with respect to the inclusion of a second correlation unit 236, a polarity detection unit 237 and a field number signal generation unit 238, and functions of the a compensation unit 233A differ somewhat from the compensation unit 233.

The second correlation unit 236 may have the same structure as the correlation unit 231 shown in FIG. 3 and FIG. 15, and uses a part of a second PN63 symbol string as the reference symbol string for correlation. Note that the second correlation unit 236 may output only correlation values necessary for detecting polarity, may output any value at other times, as well as may temporarily stop outputting values.

The polarity detection unit 237 outputs a polarity specified from a position viewed as the maximum in the correlation value string output from the second correlation unit 236. If the polarity of the second PN63 symbol string is inverse of the polarity of the first and third PN63 symbol strings, the second PN63 symbol string can be identified as being in the second field.

Note that the polarity detection unit 237 may use only a portion of the correlation that is necessary to detect polarity, and at this time, may use the position of the correlation value detected by the first position detection unit 232 or the second position detection unit 234 considered to be the maximum.

The compensation unit 233A only differs from the compensation unit 233 of embodiment 1 with respect to performing compensation processing using the polarity output by the polarity detection unit 237, and all other functions are the same.

The compensation unit 233A stores a correlation error value string obtained by cross-correlating a known symbol string not affected by white noise or multipath and including from the PN511 symbol string to the third PN63 symbol string, with a reference symbol string which is a part of the PN511 symbol string.

There are two patterns for the second PN63 symbol string, polarity-reversed and not, and the compensation unit 233A stores a correlation error value string corresponding to each of these two patterns. More precisely, the compensation unit 233A stores at least a part of these correlation error value strings normalized with a respective maximum.

The compensation unit 233A also obtains the polarity of the second PN63 portion detected by the polarity detection unit 237, judges which of the error value string patterns to use for performing compensation, and performs compensation processing.

Note that the correlation error value strings can be obtained as-needed by an operation, and in this case, the compensation unit 233A may not store correlation error value string in advances, or may store one pattern of correlation error value string and a difference between this pattern and the other pattern.

The field number signal generation unit 238 generates and outputs a field number signal based on the polarity output by the polarity detection unit 237. Note that the field number signal generation unit 238 may be able to output any signal.

Using the sync detection unit 23A of variation 1 enables performing compensation processing using longer correlation error value strings than when using the above-mentioned sync detection unit 23, thereby expanding the compensatable range for distorted channel response and enabling high-precision estimation for channel response pertaining to longer periods of time.

Variation 2

The sync detection unit of the present invention may have the following structure.

FIG. 16 shows a functional structure of the sync detection unit of variation 2.

Function units of a sync detection unit 23B in FIG. 16 that are the same as in the above-mentioned sync detection unit 23 and the sync detection unit 23A described in variation 1 have been given the same characters, and descriptions thereof have been omitted.

The sync detection unit 23B differs from the sync detection unit 23A of variation 1 with respect to the inclusion of a mode detection unit 239 and a VSB mode signal generation unit 240, and functions of a compensation unit 233B differ somewhat from the compensation unit 233.

The mode detection unit 239 detects a VSB mode symbol included in the input signal, with use of a reference symbol string which is a part of a VSB mode symbol string.

Note that the mode detection unit 239 may select, from the input signal, only a portion necessary for detecting the mode, and here, may use position information of the correlation value detected as the maximum by the first position detection unit 232 or the second position detection unit 234.

The compensation unit 233B only differs from the compensation unit 233A of variation 1 with respect to performing compensation processing using a known VSB mode symbol string that specifies the VSB mode detected by the mode detection unit 239, whereby all other functions are the same.

The compensation unit 233B stores a correlation error value string obtained by cross-correlating a known symbol string not affected by white noise or multipath and including from the PN511 symbol string to the VSB mode symbol string, and a part of the PN511 symbol string.

As mentioned in variation 1, there are two patterns for the second PN63 symbol string, polarity-reversed and not, and there are at most five types of VSB modes, whereby the sync detection unit of the present invention stores a total of 10 (2×5=10) correlation error value strings corresponding to these patterns. More precisely, the sync detection unit stores at least a part of these correlation error value strings normalized with a respective maximum.

The compensation unit 233B also obtains the polarity of the second PN63 portion detected by the polarity detection unit 237 and the VSB mode detected by the mode detection unit 239, judges which of the correlation error value string patterns to use for performing compensation, and performs compensation processing.

Note that variation 2 may be applied to embodiment 1 as well as variation 1, the correlation error value strings can be obtained as-needed by an operation, and in this case, the compensation unit 233B may not store correlation error value strings in advance, or may store one pattern of correlation error value string and differences between this pattern and the other patterns.

The VSB mode signal generation unit 240 generates and outputs a VSB mode signal based on the VSB mode symbol string detected by the mode detection unit 239. Note that the VSB mode signal generation unit 240 may be able to output any signal.

Using the sync detection unit 23B of variation 2 enables performing compensation processing us linger correlation error value strings than with use of the above-mentioned sync detection units 23 and 23A, thereby expanding the compensatable range for distorted channel response and enabling high-precision estimation for channel response pertaining to longer periods of time.

Embodiment 2

The following describes a signal detection device of embodiment 2.

In the present embodiment, the signal detection device of the present invention is used as the mode detection unit described in variation 2 of the above-mentioned embodiment 1.

One method of conventional VSB mode detection uses two levels of hard-decided values. The VSB mode detection method disclosed in U.S. Pat. No. 5,745,528 is one such example.

Even if the input signal is distorted by white noise and multipath, using the mode detection unit of the present invention enables more accurate VSB mode detection than using hard-decision, which is the conventional VSB mode detection method.

Figure 17:
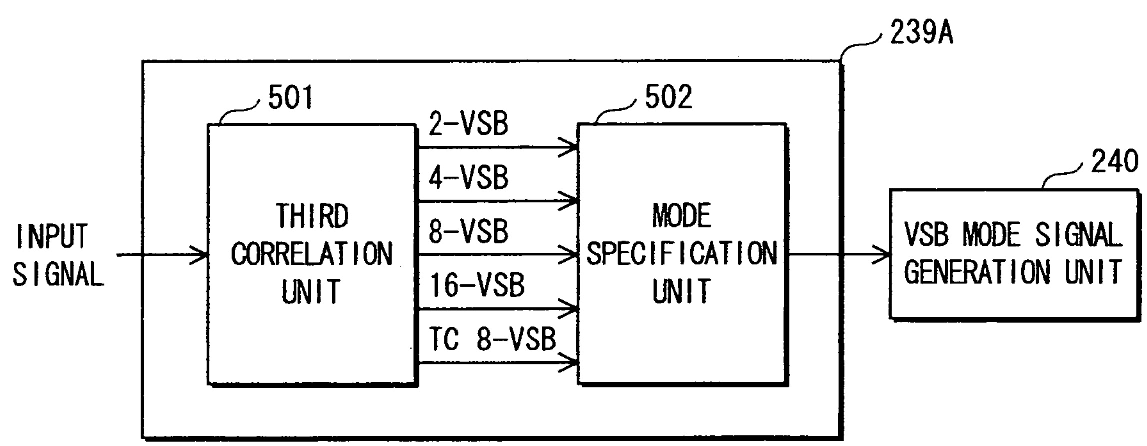
FIG. 17 shows a functional structure of a mode detection unit according to embodiment 2.

FIG. 17 shows a functional structure of the mode detection unit.

A mode detection unit 239A includes a third correlation unit 501 and a mode specification unit 502 as function units.

The third correlation unit 501 cross-correlates a sequentially input symbol string and a VSB mode symbol string that identifies VSB modes of the ATSC system.

Note that a position of the VSB mode symbol string may be specified based on a maximum position detected by the first position detection unit 232 or the second position detection unit 234 of the above-mentioned embodiment 1.

FIG. 18 is a table showing 24-bit data of VSB modes in the ATSC system. A bit in FIG. 18 is one symbol, where 1 represents the level "+5" and 0 represents the level "−5".

There are five types of VSB modes, namely 2-VSB, 4-VSB, 8-VSB, 16-VSB and TC 8-VSB.

The mode specification unit 502 specifies, from the correlation result output by the third correlation unit 501 with respect to the VSB mode symbol strings, a VSB mode symbol string with the maximum, and outputs the specified VSB mode symbol string with the maximum to the VSB mode signal generation unit 240.

According to the above structure, even if the received signal is distorted by white noise and multipath, the mode specification unit 502 can specify, from the correlation of the sequentially input symbol strings and the VSB mode symbol strings identifying VSB modes in the ATSC system, the VSB mode symbol string with the maximum as the VSB mode of the input symbol string, thereby enabling more accurate VSB mode detection than by hard-decision, which is the conventional method of VSB mode detection.

Variation 3

The mode detection unit of the present invention may also have the following structure.

Figure 19:
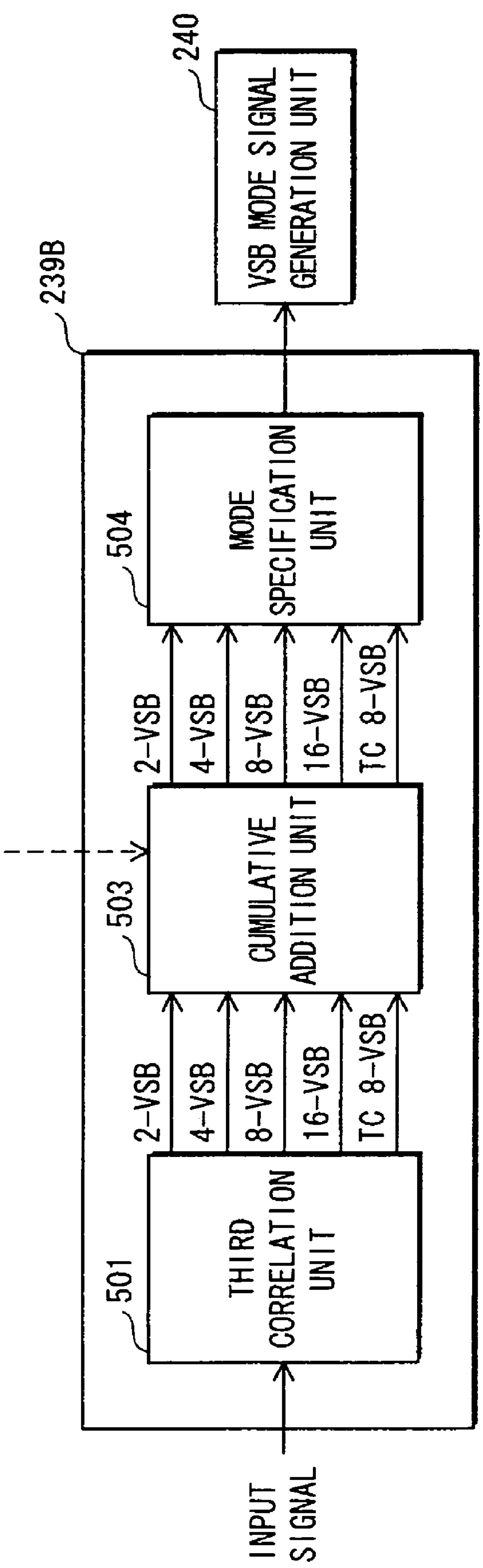
FIG. 19 shows a functional structure of a mode detection unit according to variation 3.

FIG. 19 shows a functional structure of a mode detection unit 239B of variation 3.

The mode detection unit 239B includes a third correlation unit 501, a cumulative addition unit 503 and a mode specification unit 504.

The third correlation unit 501 is the same as described above.

The cumulative addition unit 503 obtains correlations between the input symbol strings and VSB mode symbol strings for only a predetermined number of fields, and cumulatively adds the obtained correlation values to each of the VSB mode symbol strings.

The mode specification unit 504 specifies the VSB mode symbol string with the largest value added by the cumulative addition unit 503, and outputs the specified VSB mode symbol string to the VSB mode signal generation unit 240.

According to the structure in variation 3, cumulatively adding correlation values of VSB modes for only a predetermined number of fields enables accurate VSB mode detection even if there is a momentary generation of a very large amount of white noise or the like.

Variation 4

The mode detection unit of the present invention may also have the following structure.

Figure 20:
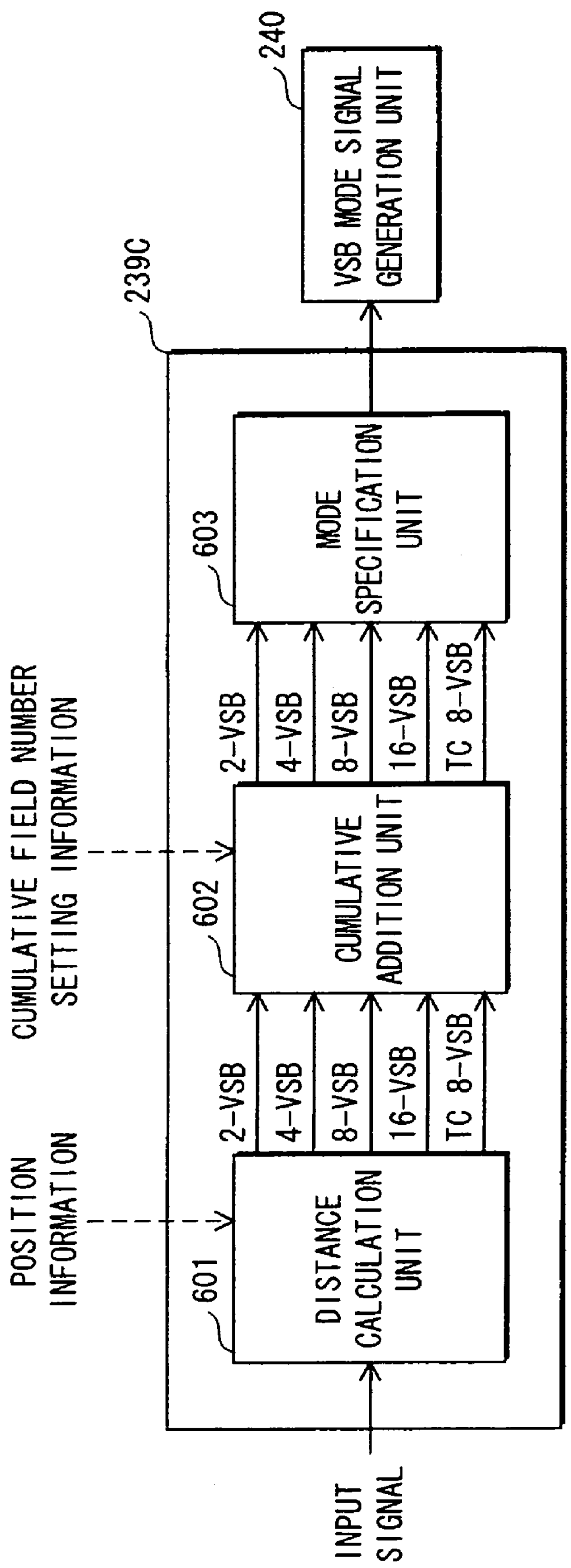
FIG. 20 shows a functional structure of a mode detection unit according to variation 4.
Figure 21:
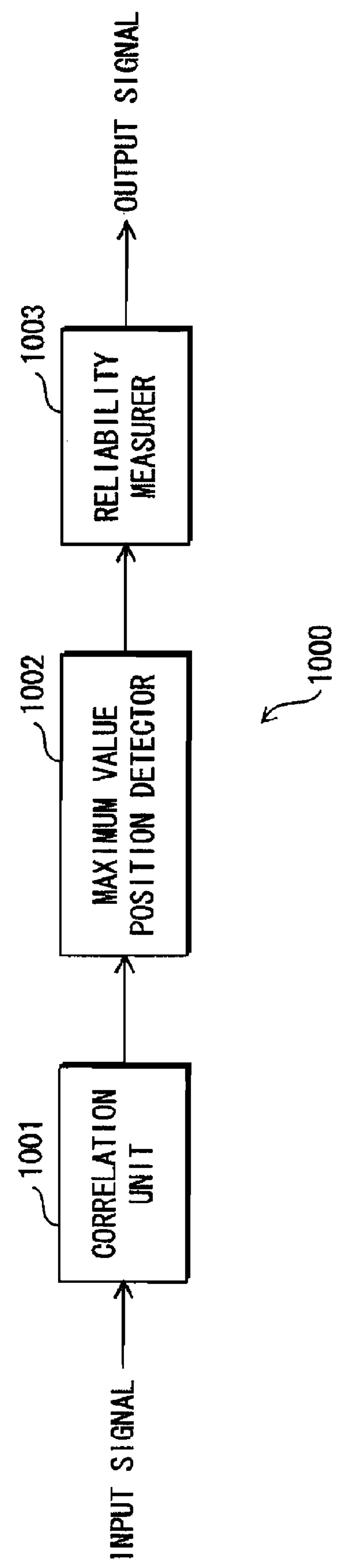
FIG. 21 shows an exemplary functional structure of a conventional signal detection device.

FIG. 20 shows a functional structure of a mode detection unit 239C of variation 4.

The mode detection unit 239C includes a distance calculation unit 601, a cumulative addition unit 602 and a mode specification unit 603.

The distance calculation unit 601 specifies a section position of a VSB mode symbol string in an input symbol string, based on the position detection by the first position detection unit 232 or second position detection unit 234 described in embodiment 1, and calculates, as a distance for each VSB mode, a level difference between at least one symbol value in the specified section and a corresponding symbol value on each known VSB module symbol string.

The cumulative addition unit 602 cumulatively adds the distance obtained for each VSB mode by the distance calculation unit 601.

The mode specification unit 603 specifies the VSB mode symbol string with the lowest value added by the cumulative addition unit 602, and outputs the specified VSB mode symbol string to the VSB mode signal generation unit 240.

According to the structure in variation 4, it is possible to accurately perform VSB mode detection even if there is white noise and multipath since the distance from the VSB mode symbol can be cumulatively added using the signal before hard-decision.

Also, the mode detection unit 239C may have a structure in which the cumulative addition unit 602 cumulatively adds distances from VSB mode symbols for only a predetermined number of fields, and the added distances are output to the mode specification unit 603.

According to this structure, cumulatively adding distances with respect to VSB mode symbols for only a predetermined number of fields enables accurate VSB mode detection even if there is a momentary generation: of a very large amount of white noise or the like.

Supplementary Remarks

Note that the present invention is of course not limited to the content described in the above embodiments. In other words:

(1) The sync detection unit of embodiment 1 and variations 1 and 2 may detect a reference symbol string from any signal after modulation, and may estimate channel response.

(2) The correlation unit 231 of embodiment 1 may select only a portion of the input signal necessary for correlation, and cross-correlate the selected portion with the reference symbol string.

(3) The correlation value positions detected by the first position detection unit 232 and the second position detection unit 234 described in embodiment 1 may be indicated as relative positions when a predetermined position has been considered to be the basis.

(4) Unless performing compensation by suppressing correlation error values from correlation values, the compensation units 233, 233A and 233B described in embodiment 1 and variations 1 and 2 may only normalize the correlation value string.

(5) The compensation unit 233 described in embodiment 1 may consider all correlation values other than the maximum to be correlation error values, and perform compensation by setting at least a part of positions of the correlation error values that require compensation as a predetermined value such as 0.

(6) The compensation unit 233 described in embodiment 1 may, with the aim of suppressing errors in the correlation value string down to, for example, a predetermined basis value of an error etc. included in a predetermined local maximum, perform compensation processing by replacing the portion considered to be the maximum with one of several predetermined local maxima.

(7) Given that the power levels of a reception signal transmitted on a direct path and a reception signal transmitted on a reflex path are often different, the compensation unit 233 described in embodiment 1 may consider both reception signals to have the same power level and store or calculate in advance respective correlation error value strings or a composited correlation error value string in order to facilitate compensation.

(8) In order to obtain more reliable output, the second position detection unit 234 described in embodiment 1 may accumulate two or more detected maxima, and output at least one of a most accumulated position, a position of a maximum for a relative position, or a relative position, or an average proportional value of the correlation value or an average proportional value of the proportional correlation value; or in order to avoid erroneous variations due to noise etc. on the channel, may output at least one of a pre-variation position, relative position, correlation value, or relative correlation value until the number of times the position has changed reaches a predetermined count.

(9) The sync-detected signal generation unit 235 described in embodiment 1 may generate and output any signal such as a signal specifying a position in a correlation value string detected by the second position detection unit 234 or a corresponding section.

(10) The sync-detected signal generation unit 235 described in embodiment 1 can also output any signal using input, and, when a position output by the second position detection unit 234 changes, may output an amount of the change in the position to notify the change to other units.

(11) If a recommendation symbol string such as PN63, a symbol string to be used in a future expanded system, or the like is included in at least a part of a reserved symbol string following the VSB mode symbol string, the mode detection unit 239 described in variation 2 may detect at least a part of this symbol string, and the detection may be used by the compensation unit 233B.

In this case, at least the part of the detected reserved symbol string is added to the known symbol string, thereby obtaining a longer correlation error value string and enabling the compensation unit 233B to perform compensation on a longer correlation value string.

(12) Although the third correlation unit 501 of embodiment 2 and variation 3 was described as having a structure that cross-correlates all VSB mode symbol strings and the input symbol string, a cross-correlation may not be taken with respect to a common portion of symbols string of all VSB modes.

(13) The third correlation unit 501 of embodiment 2 and variation 3 need not necessarily cross-correlate all VSB mode symbol strings with the input symbol string, and if, for example, a cross-correlation is only required with two types of VSB modes, only the portion of one VSB mode symbol string that differs from the other VSB mode symbol string may be cross-correlated. Only a single correlation device is necessary since the cross-correlation result with the other VSB mode symbol string can be obtained by sign-inversion.

(14) The third correlation unit 501 described in embodiment 2 and variation 3, the cumulative addition unit 503 of variation 3, and the cumulative addition unit 602 of variation 4 may normalize the correlation values. One example of the normalization method involves subtracting the lowest correlation value from each of the correlation values. This reduces the bit-width required for the correlation values.

(15) The third correlation unit 501 described in embodiment 2 and variation 3 and the distance calculation unit 601 described in variation 4 may calculate correlations after lowering the precision of the input symbol string, that is, the bit-width. This enables the reduction of the circuitry scale for correlation operations or distance calculations.

(16) The third correlation unit 501 described in embodiment 2 and variation 3 may calculate correlation values by taking an absolute value of the input symbol string, or the mode specification unit 502 may instead detect the maximum with respect to the absolute value of the correlation value.

This enables the maximum to be detected even if 180 degree phase uncertainty exists in the input signal.

(17) The cumulative addition unit 503 described in variation 3 and the cumulative addition unit 602 described in variation 4 may average a cumulative correlation value or cumulative distance in field units and output the averaged cumulative correlation value or cumulative distance.

As a result, the accuracy of VSB mode detection is even higher. Sliding average can be used in the average processing.

(18) The cumulative addition unit 602 described in variation 4 cumulatively adds distances with respect to the VSB mode symbol strings. However, the cumulative addition unit 602 may not perform cumulative addition with respect to, for example, symbols that are common symbol string candidates for all VSB modes. In this case, the differences between cumulatively added values between VSB modes are the same as the above examples, and the performance of VSB mode detection is the same.

(19) Compensation processing can be at least temporarily stopped if there is no need for compensation in the compensation units 233, 233A and 233B described in embodiment 1.

(20) Given that it is conceivable for the local maxima and positions versus the maximum in the output signal output from the compensation units 233, 233A and 233B described in embodiment 1 to indicate values and delay times of a signal transmitted over a reflex pathway versus a signal transmitted over a direct pathway, the local maxima and positions thereof can be used as impulse responses of the distorted channel. For example, they can be used in coefficient generation of the equalization unit 24 shown in FIG. 1, can be monitored as channel response, and can be used in a spectrum conversion unit etc. (not depicted) for conversion to spectrum using Fourier transform or the like.

(21) In order to increase tolerance for noise on channels, the above-mentioned correlation unit 231, first position detection unit 232, second position detection unit 234, second correlation unit 236 and polarity detection unit 237 may perform processing after considering a predetermined section from among at least a portion composed of at least one group in the input signal to be a unit and obtaining a proportional value that has been averaged per position of two or more units. Also, a section of at least a portion composed of at least one group on the processing results may be considered to be a unit, and a proportional value that has been averaged per position of two or more units may be obtained and output.

(22) Output of the above-mentioned compensation units 233, 233A and 233B may be pre-compensation correlation output. Also, such output may be output that has been averaged per field unit, and sliding average may be used in the average processing.

(23) In embodiment 1, the length of the reference signal used for correlation when generating output from the compensation units 233, 233A and 233B may be different from the length of the reference signal used for correlation when generating correlation output from the correlation unit 231 to the first position detection unit 232, and the compensation units may be provided with a correlation unit other than the correlation unit 231 for output signals.

Furthermore, the correlation values obtained by using a portion of the signal value string input to the correlation unit 231 may be set as the output signal. Alternatively, the correlation value string output from the correlation unit 231 may also be used as the output signal, and the correlation values obtained using a portion of the signal value string input to the correlation unit 231 may be input to the first position detection unit 232.

(24) The sync detection units 23, 23A and 23B described in embodiment 1 may detect either a field synchronization symbol or a segment synchronization symbol first, and may use either detection result.

(25) The reference symbol string described in embodiments 1 and 2 is not limited to a portion of the segment sync, PN511, PN63, VSB mode symbol string or reserved symbol string. In other words, any complex signal other than a VSB signal may be used as the input symbol string. Also, the signal targeted for detection is not limited to a synchronization signal, but rather may be, for example, any signal such as an acyclic signal.

(26) It may be possible to receive output from another unit of the reception device shown in FIG. 1 to increase the length of the known symbol string. In this case, for example, at least one input may be added to the compensation units 233, 233A and 233B to increase the number of stored correlation error values.

(27) The above-mentioned functional units may have structures that use a reduced operation precision or polarity of the input signal or output signal. For example, the functional units may use-values raised to an arbitrary power.

(28) In embodiment 1, when the position information output by the second position detection unit 234 changes, the sync-detected signal generation unit 235 may additionally output the variation of the position shown in FIG. 4.

(29) Although a position in the VSB mode symbol string may be specified based on the position information output by the first position detection unit 232 or the second position detection unit 234 in embodiment 2, a position in the VSB mode symbol string may be specified by including another functional-unit that generates an information signal equivalent to the position information output by the first position detection unit 232 or second position detection unit 234.

(30) The signal detection device of embodiment 2 is described as a mode detection device that detects, but is not limited to, an ATSC system VSB mode, and can be applied to cases of signals of any system if the signals include a known signal for mode specification.

(31) Although described as a mode detection device that detects any of 2-VSB, 4-VSB, 8-VSB, 16-VSB and TC 8-VSB modes in embodiment 2, the signal detection device pertaining to the present invention may perform VSB mode detection using only the two modes 16-VSB and TC 8-VSB as candidates since operation provisions for U.S. DTV specify the operation of only these two modes. Also, the mode candidates need not be limited to the aforementioned.

(32) Although the signal detection device of embodiment 2 is described as detecting a VSB mode symbol string in embodiment 2, if, for example, there are two or more known symbol string candidates in the reserved area of the field sync segment shown in FIG. 4, the signal detection device may, in parallel with VSB mode detection, detect the most likely candidate (mode) in the reserved area. This can be realized by providing a set of all the units shown in embodiment 2 for each of the candidates to be detected.

(33) In order to manage positions and processing times of the functional units, the signal detection device described in the embodiments may be provided with at least one time measuring unit for using a counter etc. outputting time information to obtain an elapsed time etc. from a predetermined time, and the output of the time measuring unit may be input to and used by at least one of the functional units.

(34) An aim of the present invention may be realized by storing signal detection processing performed by the signal detection device described in the embodiments as a computer program in memory, and causing the signal detection processing to be performed with use of a CPU or the like. In other words, the present invention may be such a computer program. Also, the present invention may be digital signals representing the computer program.

(35) Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded.

(36) The present invention may be a signal detection method including the operations of the above-mentioned compensation processing (e.g., operations shown in FIG. 11 and FIG. 13).

(37) The present invention may be a signal detection circuit constituted from circuits that perform processing equivalent to the functional units constituting the above-mentioned signal detection device.

(38) In embodiment 1, the front-end unit 2 and the back-end unit 3 may each be made into a single and separate chip, or may be made into a single chip including a portion or all portions thereof.

Note that an integrated circuit can be called an IC or an LSI depending on the integration degree of the elements.

Also, a special purpose circuit, general purpose processor, a combination thereof etc., or an FPGA (Field Programmable Gate Array) having a modifiable architecture, a reconfigurable processor, a combination thereof etc. may be used as an integrated circuit device, and moreover, if another device substituting a semiconductor integrated circuit is proposed according to technological advances, such a device may be used as the integrated circuit device. One such example is an integrated circuit using biotechnology. Also, the signals targeted for processing may be not only electrical signals, but any signal such as optical signals, magnetic signals, or a combination thereof.

INDUSTRIAL APPLICABILITY

The present invention can be applied to a digital broadcast reception device, a relaying device, a wireless or wire communication device, a measuring device, or an integrated circuit, program etc. having such constituent elements.

The invention claimed is:

1. A signal detection device comprising:

a correlation unit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection unit operable to detect a first position in the correlation value string output by the correlation unit, the first position being based on a position of a correlation value viewed as a maximum or a local maximum; and a compensation unit operable to perform compensation, using a processor, by obtaining a correlation error of at least one of the output correlation values and suppressing the correlation error from the at least one correlation value, wherein the compensation unit performs the compensation by obtaining the correlation error of the correlation value at at least one position other than the first position detected by the first position detection unit, and suppressing the correlation error from the at least one correlation value, and the compensation unit performs the compensation by associating the first position detected by the first position detection unit and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, and suppressing, based on a correlation error value at a position in the correlation error value string corresponding to a second position other than the first position, the correlation error from a correlation value at the second position.

2. A signal detection device comprising:

a correlation unit operable to output a correlation value string based on a result of cross-correlating (i) a reference signal value string and (ii) signal value strings that are obtained by shifting a certain signal value string one by one in an order of the input signal value string, and that correspond in length to the reference signal value string, the reference signal value string being included in an input signal value string together with another reference signal value string for specifying a polarity;

a second correlation unit operable to output a second correlation value string based on a result of cross-correlating the another reference signal value string and signal value strings that are obtained by shifting a certain signal value string one by one in an order of the input signal value string, and that correspond in length to the another reference signal value string;

a polarity detection unit operable to output a polarity that is specified based on a position of a correlation value viewed as a maximum or a local maximum on the second correlation value string output by the second correlation unit; and a compensation unit operable to perform compensation, using a processor, by obtaining a correlation error of at least one of the output correlation values output by the correlation unit and suppressing the correlation error from the at least one correlation value, wherein the compensation unit performs the compensation based on the polarity specified by the polarity detection unit and the correlation error.

3. A detection device wherein comprising:

a correlation unit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection unit operable to detect a first position in the correlation value string output by the correlation unit, the first position being based on a position of a correlation value viewed as a maximum or a local maximum; and a compensation unit operable to perform compensation, using a processor, by obtaining a correlation error of at least one of the output correlation values and suppressing the correlation error from the at least one correlation value, wherein the compensation unit performs the compensation by obtaining the correlation error of the correlation value at at least one position other than the first position detected by the first position detection unit, and suppressing the correlation error from the at least one correlation value, the first position detection unit detects a maximum position that is a position corresponding to a correlation value viewed as the maximum on the correlation value string, and a local maximum position that is a position corresponding to a correlation value viewed as the local maximum on the correlation value string, and the compensation unit performs the compensation by one of associating the local maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a correlation error value on the correlation error value string at a position corresponding to the maximum position, and suppressing, based on the correlation error value, a correlation error from the correlation value at the maximum position, and associating the maximum position and a position of a maximum on the correlation error value string, obtaining a correlation error value on the correlation error value string at a position corresponding to the local maximum position, and suppressing, based on the correlation error value, a correlation error from the correlation value at the local maximum position.

4. A signal detection device comprising:

a correlation unit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection unit operable to detect a first position in the correlation value string output by the correlation unit, the first position being based on a position of a correlation value viewed as a maximum or a local maximum; and a compensation unit operable to perform compensation, using a processor, by obtaining a correlation error of at least one of the output correlation values and suppressing the correlation error from the at least one correlation value, wherein the compensation unit performs the compensation by obtaining the correlation error of the correlation value at at least one position other than the first position detected by the first position detection unit, and suppressing the correlation error from the at least one correlation value, the first position detection unit detects a maximum position that is a position in the correlation value string which corresponds to a correlation value viewed as the maximum, and a local maximum position that is a position in the correlation value string which corresponds to a correlation value viewed as the local maximum, and the compensation unit performs the compensation by associating the maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a first correlation error value on the correlation error value string at a position corresponding to the local maximum position, associating the local maximum position and the position of the maximum on the correlation error value string, obtaining a second correlation error value on the correlation error value string at a position corresponding to the maximum position, and one of suppressing, based on a first composite correlation error value obtained by subtracting the second correlation error value from the first correlation error value, a correlation error from the correlation value at the local maximum position, and suppressing, based on a second composite correlation error value obtained by subtracting the first correlation error value from the second correlation error value, a correlation error from the correlation value at the maximum position or the local maximum position.

5. A signal detection circuit comprising:

a correlation circuit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection circuit operable to detect a first position in the correlation value string output by the correlation circuit, the first position being based on a position of a correlation value viewed as a maximum or a local maximum; and a compensation circuit operable to perform compensation by obtaining a correlation error of at least one of the output correlation values and suppressing the correlation error from the at least one correlation value, wherein the compensation circuit performs the compensation by associating the first position detected by the first position detection circuit and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, and suppressing, based on a correlation error value at a position in the correlation error value string corresponding to a second position other than the first position, the correlation error from a correlation value at the second position.

6. A signal detection circuit comprising:

a correlation circuit operable to output a correlation value string based on a result of cross-correlating (i) a reference signal value string and (ii) signal value strings that are obtained by shifting a certain signal value string one by one in an order of the input signal value string, and that correspond in length to the reference signal value string, the reference signal value string being included in an input signal value string together with another reference signal value string for specifying a polarity;

a second correlation circuit operable to output a second correlation value string based on a result of cross-correlating the another reference signal value string and signal value strings that are obtained by shifting a certain signal value string one by one in an order of the input signal value string, and that correspond in length to the another reference signal value string;

a polarity detection circuit operable to output a polarity that is specified based on a position of a correlation value viewed as a maximum or a local maximum on the second correlation value string output by the second correlation circuit and a compensation circuit operable to perform compensation by obtaining a correlation error of at least one of the output correlation values and suppressing the correlation error from the at least one correlation value, wherein the compensation circuit performs the compensation based on the polarity specified by the polarity detection circuit and the correlation error.

7. A signal detection circuit comprising:

a correlation circuit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection circuit operable to detect a first position in the correlation value string output by the correlation circuit, the first position being based on a position of a correlation value viewed as a maximum or a local maximum; and a compensation circuit operable to perform compensation by obtaining a correlation error of at least one of the output correlation values and suppressing the correlation error from the at least one correlation value, wherein the compensation circuit performs the compensation by obtaining the correlation error of the correlation value at at least one position other than the first position detected by the first position detection circuit, and suppressing the correlation error from the at least one correlation value, the first position detection circuit detects a maximum position that is a position corresponding to a correlation value viewed as the maximum on the correlation value string, and a local maximum position that is a position corresponding to a correlation value viewed as the local maximum on the correlation value string, and the compensation circuit performs the compensation by one of associating the local maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a correlation error value on the correlation error value string at a position corresponding to the maximum position, and suppressing, based on the correlation error value, a correlation error from the correlation value at the maximum position, and associating the maximum position and a position of a maximum on the correlation error value string, obtaining a correlation error value on the correlation error value string at a position corresponding to the local maximum position, and suppressing, based on the correlation error value, a correlation error from the correlation value at the local maximum position.

8. A signal detection circuit comprising:

a correlation circuit operable to output a correlation value string based on a result of cross-correlating (i) a reference signal value string included in an input signal value string and (ii) signal value strings that are obtained by shifting a certain signal value string one by one in an order of the input signal value string, and that correspond in length to the reference signal value string;

a first position detection circuit operable to detect a first position in the correlation value string output by the correlation circuit, the first position being based on a position of a correlation value viewed as a maximum or a local maximum; and a compensation circuit operable to perform compensation by obtaining a correlation error of at least one of the output correlation values and suppressing the correlation error from the at least one correlation value, wherein the compensation circuit performs the compensation by obtaining the correlation error of the correlation value at at least one position other than the first position detected by the first position detection circuit, and suppressing the correlation error from the at least one correlation value, the first position detection circuit detects a maximum position that is a position in the correlation value string which corresponds to a correlation value viewed as the maximum, and a local maximum position that is a position in the correlation value string which corresponds to a correlation value viewed as the local maximum, and the compensation circuit performs the compensation by associating the maximum position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, obtaining a first correlation error value on the correlation error value string at a position corresponding to the local maximum position, associating the local maximum position and the position of the maximum on the correlation error value string, obtaining a second correlation error value on the correlation error value string at a position corresponding to the maximum position, and one of suppressing, based on a first composite correlation error value obtained by subtracting the second correlation error value from the first correlation error value, a correlation error from the correlation value at the local maximum position, and suppressing, based on a second composite correlation error value obtained by subtracting the first correlation error value from the second correlation error value, a correlation error from the correlation value at the maximum position or the local maximum position.

9. A signal detection circuit comprising:

a correlation circuit operable to output a correlation value string based on a result of cross-correlating (i) a reference signal value string included in an input signal value string that includes another reference signal value string specifying a signal mode of an input signal and (ii) signal value strings that are obtained by shifting a certain signal value string one by one in an order of the input signal value string, and that correspond in length to the reference signal value string;

a mode detection circuit operable to detect the another reference signal value string based on the input signal value string;

a compensation circuit operable to perform compensation by obtaining a correlation error of at least one of the output correlation values and suppressing the correlation error from the at least one correlation value;

a first position detection circuit operable to detect a first position in the correlation value string output by the correlation circuit, the first position being based on a position of a correlation value viewed as a maximum or a local maximum; and a second position detection circuit operable to detect a second position in the correlation value string compensated by the compensation circuit, the second position being based on a position of a correlation value viewed as a maximum on the compensated correlation value string, wherein the compensation circuit performs the compensation based on a signal mode detected by the mode detection circuit and the correlation error, the mode detection circuit comprises:

a third correlation circuit operable to specify a position section of a mode signal value string in the input signal with use of output from the first position detection circuit or the second position detection circuit, and cross-correlate a signal value string in the position section and the another reference signal value string that is at least a part of one of a plurality of the mode signal value strings each of which is for identifying a different one of the signal modes;

a cumulative addition circuit operable to cumulatively add correlation values calculated by the third correlation circuit to the plurality of mode signal value strings N times, N being a natural number; and a mode specification circuit operable to specify, from among the plurality of mode signal value strings, a mode signal value string having a highest value cumulatively added by the cumulative addition circuit, as a signal mode of the input signal string.

10. A signal detection circuit comprising:

a correlation circuit operable to output a correlation value string based on a result of cross-correlating (i) a reference signal value string included in an input signal value string that includes another reference signal value string specifying a signal mode of an input signal and (ii) signal value strings that are obtained by shifting a certain signal value string one by one in an order of the input signal value string and that correspond in length to the reference signal value string;

a mode detection circuit operable to detect the third reference signal value string based on the input signal value string;

a compensation circuit operable to perform compensation by obtaining a correlation error of at least one of the output correlation values and suppressing the correlation error from the at least one correlation value;

a first position detection circuit operable to detect a first position in the correlation value string output by the correlation circuit, the first position being based on a position of a correlation value viewed as a maximum or a local maximum; and a second position detection circuit operable to detect a second position in the correlation value string compensated by the compensation circuit, the second position being based on a position of a correlation value viewed as a maximum on the compensated correlation value string, wherein the compensation circuit performs the compensation based on a signal mode detected by the mode detection circuit and the correlation error, the mode detection circuit comprises:

a third correlation circuit operable to (i) output correlation values with respect to a certain mode signal value string by specifying a position section of a mode signal value string in the input signal with use of output from the first position detection circuit or the second position detection circuit, and cross-correlating a signal value string in the position section and the another reference signal value string that is at least a part of one of a plurality of the mode signal value strings each of which is for identifying a different one of the signal modes, and (ii) output values obtained by inverting a sign of the correlation values as correlation values with respect to another mode signal value string;

a cumulative addition circuit operable to cumulatively add correlation values calculated by the third correlation circuit to the plurality of mode signal value strings N times, N being a natural number; and a mode specification circuit operable to specify, from among the plurality of mode signal value strings, a mode signal value string having a highest value cumulatively added by the cumulative addition circuit, as a signal mode of the input signal string.

11. A signal detection method for performing compensation, said method comprising: obtaining a correlation value string that is based on a result of cross-correlating a reference signal value string included in a signal value string and signal value strings that are obtained by shifting a certain signal value string one by one in an order of the signal value string, and that correspond in length to the reference signal value string, detecting a first position in the correlation value string, the first position being based on a position of a correlation value viewed as a maximum or a local maximum, and obtaining a correlation error of at least one correlation value on the correlation value string; and suppressing the correlation error from the at least one correlation value, wherein the compensation is performed by (i) obtaining the correlation error of the correlation value at at least one position other than the first position, and suppressing the correlation error from the at least one correlation value, and (ii) associating the first position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, and suppressing, based on a correlation error value at a position in the correlation error value string corresponding to a second position other than the first position, the correlation error from a correlation value at the second position.

12. A non-transitory computer-readable recording medium on which a computer program for causing a signal detection device or a signal detection circuit to execute a signal detection processing method is recorded, the signal detection processing method comprising:

a compensation step of performing compensation by (i) obtaining a correlation value string that is based on a result of cross-correlating a reference signal value string included in a signal value string and signal value strings that are obtained by shifting a certain signal value string one by one in an order of the signal value string, and that correspond in length to the reference signal value string, detecting a first position in the correlation value string, the first position being based on a position of a correlation value viewed as a maximum or a local maximum, and obtaining a correlation error of at least one correlation value on the correlation value string, and (ii) suppressing the correlation error from the at least one correlation value, wherein the compensation is performed by (i) obtaining the correlation error of the correlation value at at least one position other than the first position, and suppressing the correlation error from the at least one correlation value, and (ii) associating the first position and a position of a maximum on a correlation error value string that is based on a result of cross-correlating the reference signal value string and signal value strings which are obtained by shifting a certain signal value string one by one in order of a known signal value string including the reference signal value string and which correspond in length to the reference signal value string, and suppressing, based on a correlation error value at a position in the correlation error value string corresponding to a second position other than the first position, the correlation error from a correlation value at the second position.

* * * * *